US009882797B2

(12) United States Patent
Amokrane et al.

(10) Patent No.: US 9,882,797 B2
(45) Date of Patent: Jan. 30, 2018

(54) ENABLING SOFTWARE-DEFINED CONTROL IN PASSIVE OPTICAL NETWORKS

(71) Applicant: International Business Machines Corporation, Armonk, NY (US)

(72) Inventors: Ahmed Amokrane, Briarcliff Manor, NY (US); Nikolaos Anerousis, Chappaqua, NY (US); Jinho Hwang, Ossining, NY (US); Jin Xiao, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 98 days.

(21) Appl. No.: 14/925,951

(22) Filed: Oct. 28, 2015

(65) Prior Publication Data

US 2016/0127216 A1    May 5, 2016

Related U.S. Application Data

(60) Provisional application No. 62/072,483, filed on Oct. 30, 2014.

(51) Int. Cl.
*H04B 10/20* (2006.01)
*H04L 12/26* (2006.01)
(Continued)

(52) U.S. Cl.
CPC ..... *H04L 43/0882* (2013.01); *H04B 10/0795* (2013.01); *H04L 41/0896* (2013.01);
(Continued)

(58) Field of Classification Search
CPC ............ H04L 43/0882; H04L 41/0896; H04Q 11/0067; H04Q 11/0071; H04Q 11/0066;
(Continued)

(56) References Cited

U.S. PATENT DOCUMENTS

2006/0222361 A1* 10/2006 Aoki .................. H04Q 11/0005
398/51
2007/0093124 A1* 4/2007 Varney ................ G06F 11/3409
439/499
(Continued)

OTHER PUBLICATIONS

Ahmed Amokrane et al., unpublished U.S. Appl. No. 14/963,705, filed Dec. 9, 2015, Enabling Software-Defined Control in Passive Optical Networks, pp. 1-47 plus 19 sheets formal drawings.
(Continued)

*Primary Examiner* — M. R. Sedighian
(74) *Attorney, Agent, or Firm* — Louis J. Percello; Otterstedt, Ellenbogen & Kammer, LLP

(57) ABSTRACT

A software-defined passive optical network includes a set of optical network terminals, a set of passive optical network ports, and a plurality of splitters. Each of the optical network terminals is connected to a single one of the passive optical network ports through a given one of the splitters, and the network is divided into a plurality of areas, each of which is assigned a given fraction of the passive optical network ports. Passive optical network port utilization is monitored for each of the plurality of areas; for those of the areas determined to have passive optical network port overutilization, the number of the passive optical network ports assigned thereto is increased; and for those of the areas determined to have passive optical network port underutilization, the number of the passive optical network ports assigned thereto is reduced.

6 Claims, 19 Drawing Sheets

(51) Int. Cl.
*H04B 10/079* (2013.01)
*H04Q 11/00* (2006.01)
*H04L 12/24* (2006.01)

(52) U.S. Cl.
CPC ..... *H04Q 11/0067* (2013.01); *H04Q 11/0071* (2013.01); *H04Q 11/0066* (2013.01); *H04Q 2011/0083* (2013.01); *H04Q 2011/0084* (2013.01)

(58) Field of Classification Search
CPC .... H04Q 2011/0083; H04Q 2011/0084; H04B 10/0795; H04B 10/00; H04B 10/077; H04B 10/272; H04B 10/2725; H04J 14/02; H04J 14/0227; H04J 14/0282; H04J 14/0283; H04J 14/0226; H04N 7/22
USPC ............... 398/58, 33, 63, 66, 69, 70, 71
See application file for complete search history.

(56) References Cited

U.S. PATENT DOCUMENTS

| | | | |
|---|---|---|---|
| 2009/0279551 A1* | 11/2009 | Wong | H04L 12/4641 370/395.53 |
| 2013/0089316 A1 | 4/2013 | Trojer et al. | |
| 2013/0259467 A1 | 10/2013 | Kang | |
| 2014/0155046 A1 | 6/2014 | Morrill | |
| 2014/0241717 A1 | 8/2014 | Cvijetic et al. | |

OTHER PUBLICATIONS

List of IBM Patents or Patent Applications Treated as Related.
H. Woesner and D. Fritzsche. "Sdn and openflow for converged ac-cess/aggregation networks". In Optical Fiber Communication Conference and Exposition and the National Fiber Optic Engineers Conference (OFC/NFOEC), pp. 1-3, Mar. 2013.
Vicent Sales et al. "An efficient dynamic bandwidth allocation for GPON long-reach extension systems". Optical Switching and Networking 14 (2014). pp. 6970-6977.
Wei et al. "DyCaPPON: Dynamic circuit and packet passive optical network". Optical Switching and Networking13 (2014) pp. 135-147.
Checko et al. "Cloud RAN for Mobile Networks—a Technology Overview". IEEE Communications Surveys & Tutorials, Accepted for Publication (2014), pp. 1-24.
Dejan Bojic et al. "Advanced Wireless and Optical Technologies for Small-Cell Moblie Backhaul with Dynamic Software-Defined Management". IEEE Communications Magazine, Sep. 2013, pp. 83-93.
Gringeri et al. "Extending Software Defined Network Principles to Include Optical Transport". IEEE Communications Magazine, Mar. 2013. pp. 32-40.
Amokrane et al. "Software Defined Enterprise Passive Optical Network". 10th CNSM and Workshop © 2014 IFIP. pp. 406-411.
Parol et al. "Towards networks of the future: SDN paradigm introduction to PON networking for business applications". Proceedings of the 2013 Federated Conference on Computer Science and Information Systems pp. 829-836.
Schulz-Zander et al. "Programmatic orchestration of wifi networks". In 2014 USENIX Annual Technical Conference (USENIX ATC 14), pp. 347-358, Philadelphia, PA, Jun. 2014. USENIX Association.
L.E. Li, Z.M. Mao, and J. Rexford. "Toward software-defined cellular networks". In European Workshop on Software Defined Networking (EWSDN), pp. 7-12, 2012.
Florwick et al. "Wireless LAN Design Guide for High Density Client Environments in Higher Education". Cisco Design Guide, 2013, pp. 1-41.
ITU-T Gigabit capable Passive Optical Networks (GPON). Ont man-agement and control interface specification. ITU-T G.984.4, 2008, pp. 1-430.
Erman et al. "Understanding the Super-sized traffic of the Super Bowl". IMC 2013 Oct. 23-25, 2013, Barcelona, Spain. pp. 1-7.
Dely et al. "OpenFlow for Wireless Mesh Networks". In Proceedings of 20th International Conference on Computer Communications and Networks (ICCCN), pp. 1-6, Aug. 2011.
McKeown et al. "OpenFlow: Enabling Innovation in Campus Networks". SIGCOMM Com-put. Commun. Rev., 38(2), Mar. 2008. pp. 1-6.
Suresh et al. "Towards programmable enterprise WLANS with Odin". In Proceedings of the first workshop on Hot topics in software defined networks, HotSDN, pp. 115-120, 2012.
ONF—Open Networking Foundation. SDN in the Campus Environment. ONF Solution Brief, Oct. 2013. pp. 1-11.
IBM Global Technology Services. "Smarter networks with passive optical lans". IBM White paper, Oct. 2014.
ITU-T Gigabit capable Passive Optical Networks (GPON). General characteristics. ITU-T G.984.1, 2008. pp. 1-43.
ITU-TGigabit capable Passive Optical Networks (GPON).Transmission convergence layer specification. ITU-T G.984.3, 2008, 1-135.
WiROI.WiROIVenueTool, downloaded from http://www.wireless2020.com/WiROIVenue/ on Oct. 22, 2015, pp. 1-3.
Mell et al., "The NIST definition of cloud computing" Special Publication 800-145, Sep. 2011. pp. 1-7.
Juniper Networks. Scaling the new service provider network at the edge. Juniper Networks Whitepaper, 2013. pp. 1-16.
Jason Young. Comparative Risk Analysis Between GPON Optical LAN and Traditional LAN Technologies. White Paper, SANS Institute InfoSec Reading Room, Oct. 2013. pp. 1-29.

* cited by examiner

TABLE I
LIST OF VARIABLES

| Notation | Meaning |
| --- | --- |
| $A$ | Set of areas |
| $N$ | Set of ONTs |
| $P$ | Set of GPON ports |
| $T$ | Set of time slots |
| $D_{r,t}$ | Traffic demand in area $r \in A$ during time slot $t$ |
| $u_{r,j,t}$ | Defines whether ONT $j$ is used to route the traffic of Area $r$ during time slot $t$ |
| $x_{j,k}$ | ONT $j$ is attached to GPON port $k$ |
| $y_j$ | Defines whether an ONT $j$ is deployed or not |
| $b_{j,r}$ | Defines whether an ONT $j$ is deployed in area $r$ |
| $z_k$ | Defines whether a GPON port $k$ is used or not |
| $C_k$ | The bandwidth capacity of GPON port $k$ |
| $S_k$ | The splitting ratio of GPON port $k$ (1,2,8,16,32,64) |
| $v_{k,t}$ | Defines whether GPON port $k$ is used during time slot $t$ |

FIG. 6

Algorithm 1 Continuous Network Monitoring

1:    while *true* do
2:         *underUtilized* ← $\{p \in P, p.utilization < \gamma_{low}\}$
3:         *overUtilized* ← $\{p \in P, p.utilization > \gamma_{up}\}$
4:         *other* ← $\{p \in P, p \notin underUtilized \cup overUtilized\}$
5:         if *overUtilized.size* > 0 or *underUtilized.size* > 0 then
6:             Reconfigure the network by allocating the GPON ports to areas using Algorithm 2
7:         end if
8:    end while

FIG. 7

Algorithm 2 Greedy Dynamic Capacity Steering

1: IN: $A$ The set of areas with traffic demands to route, each area has premium and best effort traffic demands
2: IN: Network deployed topology (GPON ports: $P$, ONTs : $N$)
3: OUT: Ethernet port, ONT and GPON port allocation to each area
4: while $A \neq \phi$ and $\exists p \in P, p.residual > 0$ do
5: $\quad d \leftarrow 0$
6: $\quad$ if $\exists a \in A, a.demand.premium > 0$ then
7: $\quad\quad a \leftarrow$ any area in $A$ with $a.demand.premium > 0$
8: $\quad\quad d \leftarrow a.demand.premium$
9: $\quad$ else
10: $\quad\quad a \leftarrow$ any area in $A$ with $a.demand.besteffort > 0$
11: $\quad\quad d \leftarrow a.demand.besteffort$
12: $\quad$ end if
13: $\quad p \leftarrow$ a port in $P$ with $p.residual > 0$, preferably $p$ is already in use (consolidation) and in a best fit manner
14: $\quad$ Open enough available Ethernet ports in area $a$ connected to GPON port $p$ to drain the traffic demand $d$
15: $\quad done \leftarrow$ total routed demand out of $d$ by opening available Ethernet ports
16: $\quad p.residual \leftarrow p.residual - done$
17: $\quad$ if $done == d$ then
18: $\quad\quad A.remove(a)$
19: $\quad$ else
20: $\quad\quad$ if $a.demand.premium > 0$ then
21: $\quad\quad\quad a.demand.premium \leftarrow a.demand.premium - done$
22: $\quad\quad$ else
23: $\quad\quad\quad a.demand.besteffort \leftarrow a.demand.besteffort - done$
24: $\quad\quad$ end if
25: $\quad$ end if
26: end while

FIG. 8

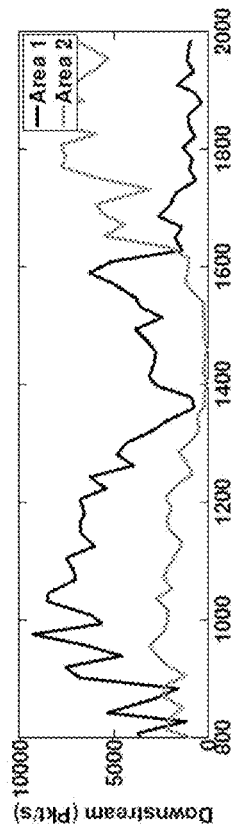
FIG. 10A Downstream traffic at the areas
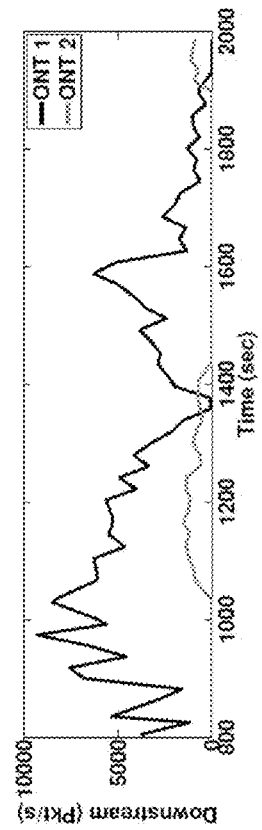
FIG. 10B Downstream traffic at the ONTs in Area 1
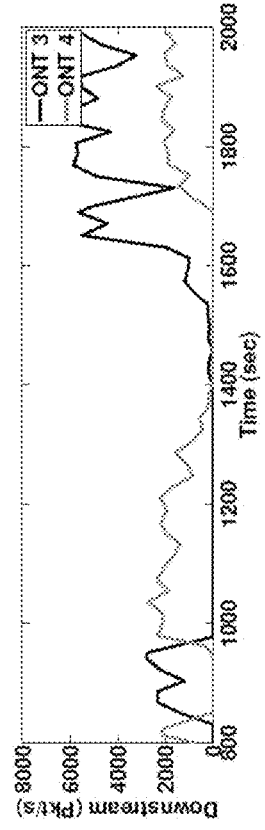
FIG. 10C Downstream traffic at the ONTs in Area 2

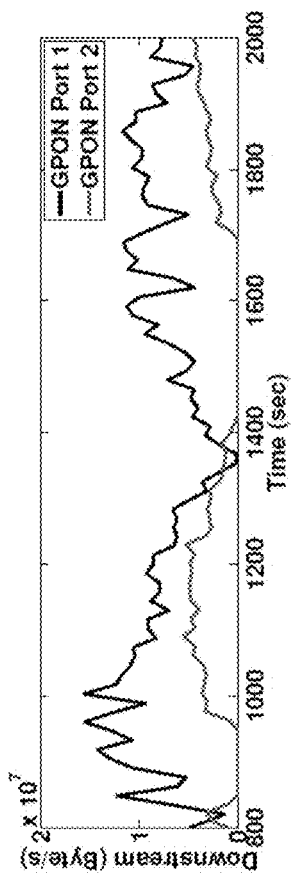
FIG. 10D Downstream traffic at the GPON ports
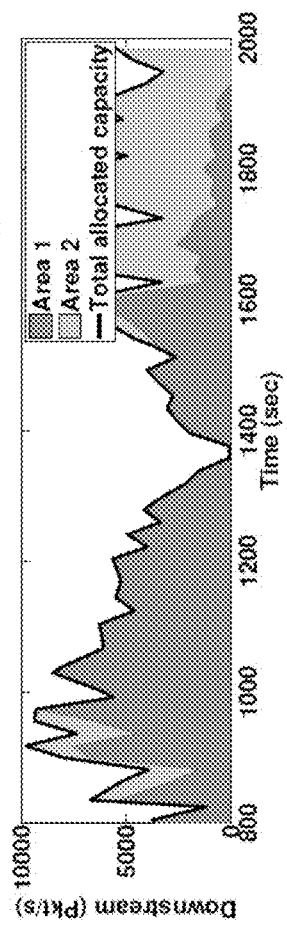
FIG. 10E Capacity allocation of GPON port 1 to the different areas
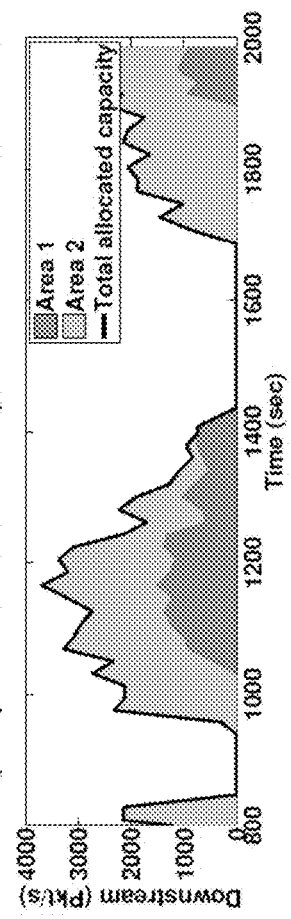
FIG. 10F Capacity allocation of GPON port 2 to the different areas

```
Input: Traffic demand and predicted patterns over time in
       areas
Traffic = { "Area": [
    { "Name": "Area 1",
      "numberOfWAPs": 20,
      "expectedNumberOfDevices": 500,
      "expectedTrafficDemand": [
          { "peak", 40 Gbps},
          { "average", 20 Gbps},
      ],
      "timeFrame": [
          { "begin", 7:00pm},
          { "end", 7:45pm},
      ]
    }
  ]
}
```
1701

```
PON configuration
Configuration = { "PON Allocation": [
    { "PON Port ID": "PON Port 1",
      "ONT ID": "ONT 1",
      "openedEthernetPort": [
          [{"portID", "port 2"}, {"NAC", "NAC1"}],
          [{"portID", "port 2"}, {"NAC", "NAC1"}],
      ]
      "timeFrame": [
          { "begin", 7:00pm},
          { "end", 7:45pm},
      ]
    }
    ],
    "NAC":{
       "NAME"="NAC 1",
       "AcceptedSubscriberVLAN":[1000]
       "AssociatedNVLAN":[200]
    },
    "NAC":{
       "NAME"="NAC 2",
       "AcceptedSubscriberVLAN":[UNTAGGED]
       "AssociatedNVLAN":[100]
    }
}
```
1703

*FIG. 17*

ENABLING SOFTWARE-DEFINED CONTROL IN PASSIVE OPTICAL NETWORKS

CROSS-REFERENCE TO RELATED APPLICATIONS

This application claims the benefit of US Provisional Application Ser. No. 62/072,483 filed 30 Oct. 2014, entitled Enabling Software-Defined Control in Passive Optical Networks, the complete disclosure of which, including appendices, is expressly incorporated herein by reference in its entirety for all purposes.

FIELD OF THE INVENTION

The present invention relates to the electrical, electronic and computer arts, and, more particularly, to network technologies, and the like.

BACKGROUND OF THE INVENTION

In the last few years, changing infrastructure and business requirements are forcing enterprises to rethink their networks. Enterprises look for network infrastructures that increase network efficiency, flexibility, and cost reduction. At the same time, the emergence of Cloud and mobile in enterprise networks has introduced tremendous variability in enterprise traffic patterns at the edge. This highly mobile and dynamic traffic presents a need for dynamic capacity management and adaptive traffic steering and appeals for new infrastructures and management solutions. In this context, passive optical networks (PON) have gained attention in the last few years as a promising solution for enterprise networks, as they can offer efficiency, security, and cost reduction. However, network management in PON is not yet automated and needs human intervention.

SUMMARY OF THE INVENTION

Principles of the invention provide techniques for enabling software-defined control in passive optical networks. In one aspect, an exemplary method includes the steps of, in a software-defined passive optical network including a set of optical network terminals, a set of passive optical network ports, and a plurality of splitters, each of the optical network terminals being connected to a single one of the passive optical network ports through a given one of the splitters, wherein the software-defined passive optical network is divided into a plurality of areas, each of the areas being assigned a given fraction of the passive optical network ports, monitoring passive optical network port utilization for each of the plurality of areas; for those of the areas determined in the monitoring step to have passive optical network port overutilization, increasing a number of the passive optical network ports assigned thereto; and for those of the areas determined in the monitoring step to have passive optical network port underutilization, reducing a number of the passive optical network ports assigned thereto.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects; for example:
- a dynamic method of path rerouting and OLT-ONT re-configuration that can aggregate multiple OLT GPON ports into the same deployment area (OLT=Optical Line Terminal, ONT=Optical Network Terminal, GPON=Gigabit Passive Optical Network),
- does not require special purpose multi-homed ONTs,
- can provide software-defined fail-over as one of the possible use case,
- Increase enterprise network performance and mobile traffic management without expensive overprovisioning,
- Increase enterprise network agility and programmability to support agile and diverse business and service requirements,
- Reduce complex and error-prone manual network service reconfiguration from hours to minutes while allowing for turnkey style network planning,
- Allow PON network integration with software-defined environments.

These and other features and advantages of the present invention will become apparent from the following detailed description of illustrative embodiments thereof, which is to be read in connection with the accompanying drawings.

BRIEF DESCRIPTION OF THE DRAWINGS

FIG. 6 presents a table with an exemplary list of variables, according to an aspect of the invention;

FIG. 7 presents a first exemplary algorithm, according to an aspect of the invention;

FIG. 8 presents a second exemplary algorithm, according to an aspect of the invention;

FIG. 10A-10F present exemplary dynamic traffic and capacity steering depending on the network load, according to an aspect of the invention;

FIG. 17 presents exemplary input and output, according to aspects of the invention.

DETAILED DESCRIPTION OF PREFERRED EMBODIMENTS

Exemplary Cloud Computing Environment

Figure 1:
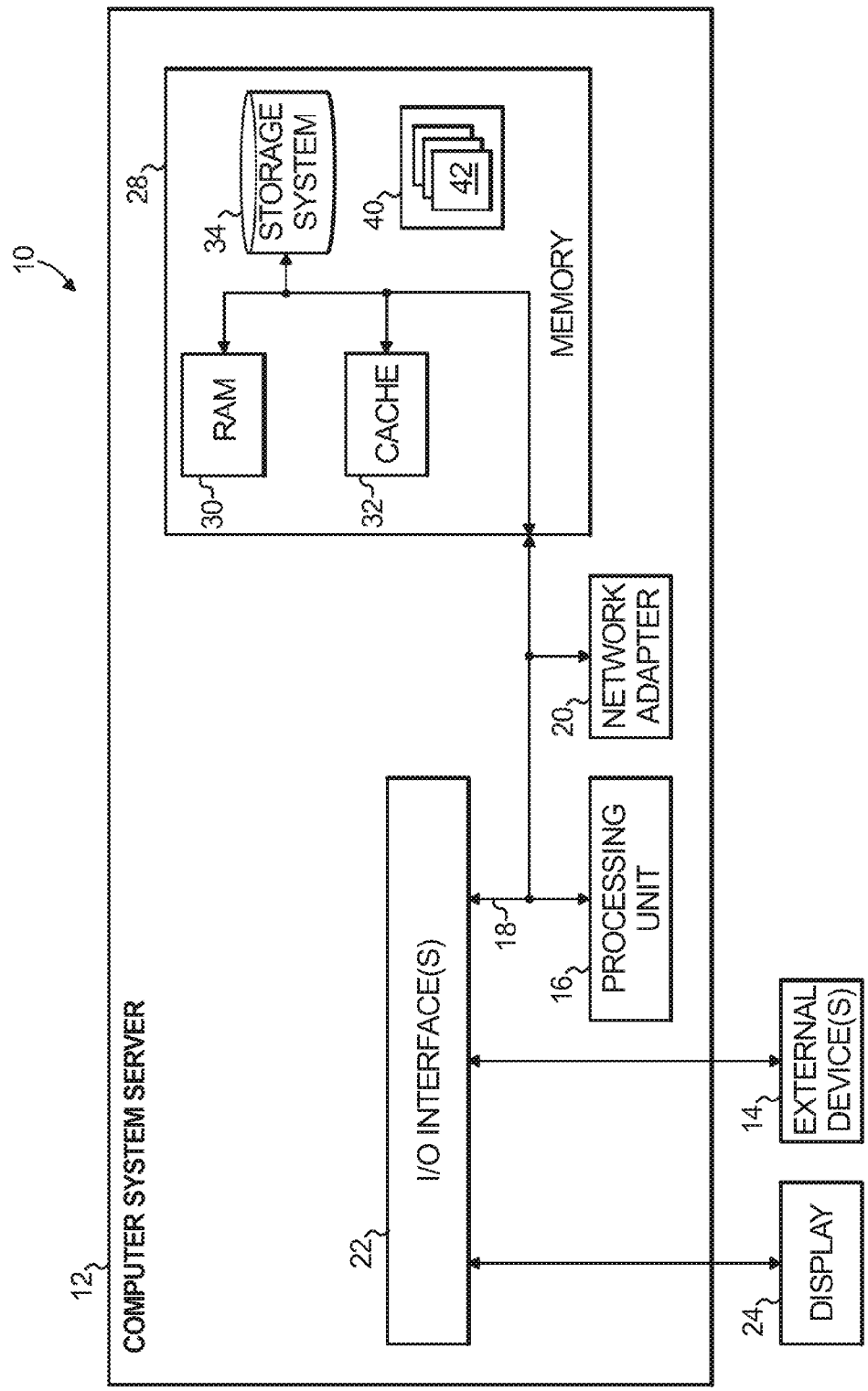
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Figure 2:
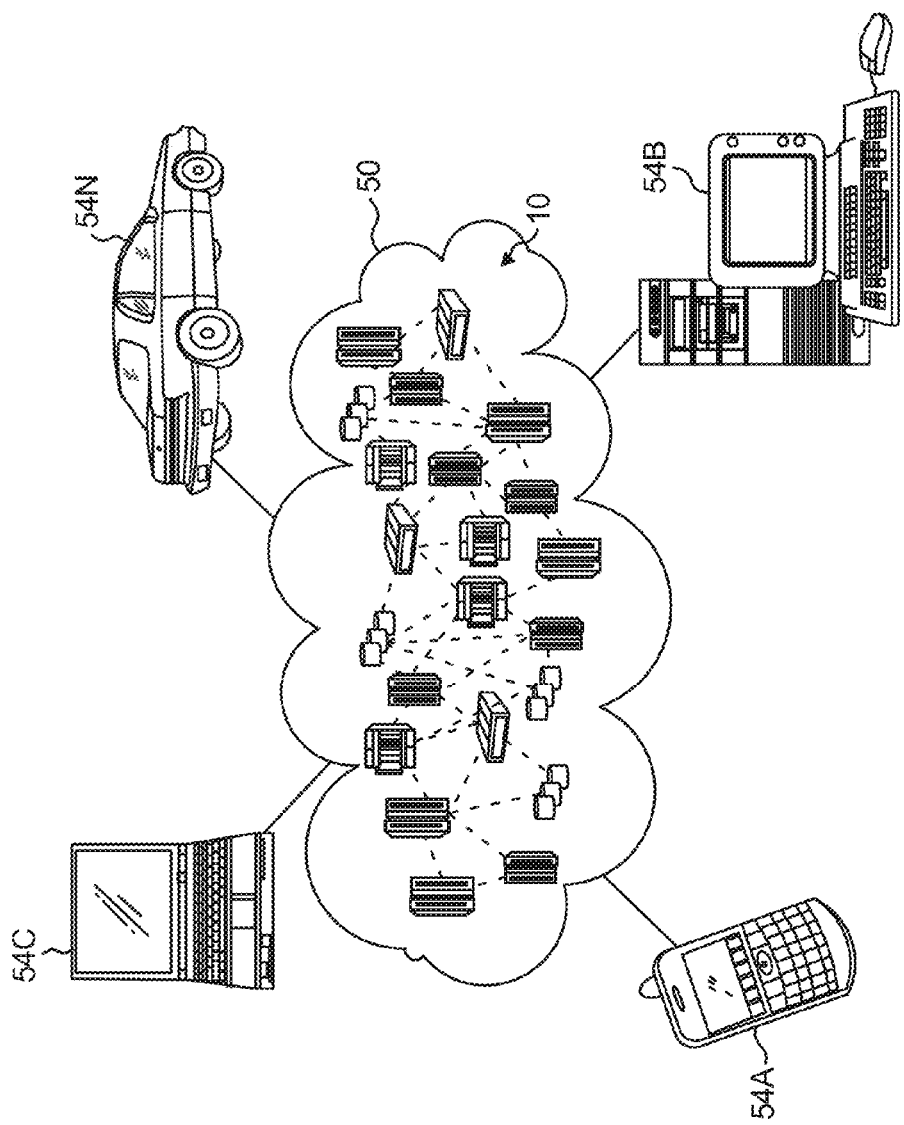
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
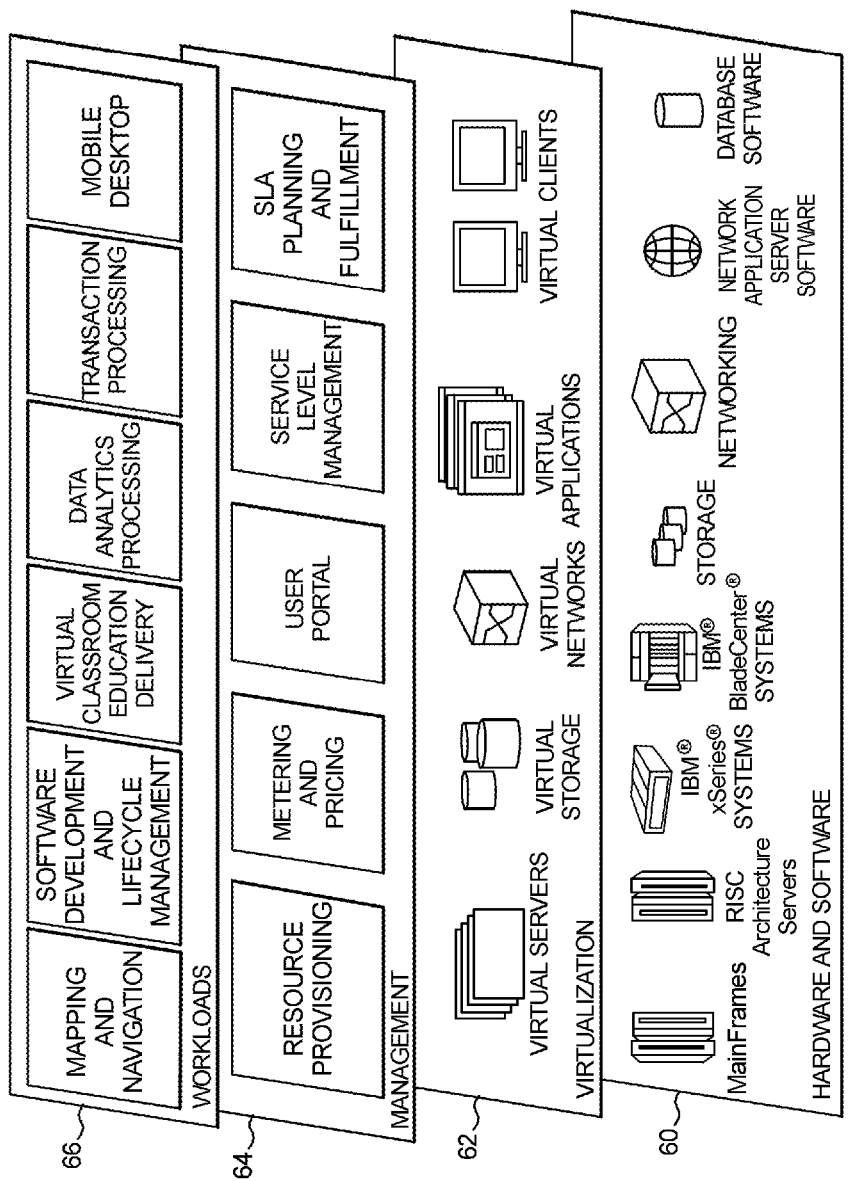
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

I. Introduction

As noted, in the last few years, changing infrastructure and business requirements are forcing enterprises to rethink their networks. Enterprises look for network infrastructures that increase network efficiency, flexibility, and cost reduction. At the same time, the emergence of Cloud and mobile in enterprise networks has introduced tremendous variability in enterprise traffic patterns at the edge. This highly mobile and dynamic traffic presents a need for dynamic capacity management and adaptive traffic steering and appeals for new infrastructures and management solutions. In this context, passive optical networks (PON) have gained attention in the last few years as a promising solution for enterprise networks, as they can offer efficiency, security, and cost reduction. However, network management in PON is not yet automated and needs human intervention. Capabilities for dynamic and adaptive PON are advantageously provided by one or more embodiments. Indeed, one or more embodiments provide a joint solution for PON capacity management both in deployment and in operation, as to maximize peak load tolerance by dynamically allocating capacity to fit varying and migratory traffic loads. To this end, novel approaches in accordance with aspects of the invention provide capacity pool based deployment and dynamic traffic steering in PON. Compared with traditional edge network design, one or more embodiments significantly reduce the need for capacity over-provisioning. Compared with generic PON networks, one or more embodiments enable dynamic traffic steering through software defined control. An exemplary embodiment was implemented for experimental purposes on a production grade PON testbed, and the results demonstrate feasibility and flexibility.

Enterprise networks today are under tremendous pressure to change. A recent study by the Economist Intelligence Unit Research, sponsored by Juniper Networks, reported that over 50% of the businesses surveyed consider IT operations a core business enabler, and yet they find that their current IT infrastructure largely falls short of expectations in driving business growth. One of the main problems faced by enterprise infrastructures today is that they are engineered for specific workload distributions and this rigidity cannot cope with disruptive yet business-vital technologies such as Cloud and mobile. In fact, with increased reliance on Cloud and mobile technologies, the enterprise network traffic pattern today is far more dynamic and nomadic. Moreover, Cloud workload varies significantly over time and mobile's traffic is migratory and volatile. Taking the stadium enterprise as an example, the traffic patterns exhibited during a game day are highly dependent on the phase and condition of a game. Before the game starts, the majority of the traffic comes from the gate entrance; during game periods, they are concentrated at the seating areas. During half-time, the concentration shifts to the concourse; and after the game, fans migrate to the parking lots. The transitory traffic volume and burst intensity is also highly related to changes in game states (e.g., a remarkable touchdown scored by the home team is likely to trigger a large surge in mobile traffic). To handle these traffic load shifts, traditional copper network designs use over-provisioning in different areas of the network to handle the peak traffic load. This often results in costly static solutions that inevitably fail as workload evolves or unusual events occur. As such, a more dynamic and flexible network design is needed in which capacity can be dynamically allocated and steered based on ever changing traffic load and distribution.

In this context, Passive Optical Networks (PON) is a promising technology that includes pertinent ingredients in addressing the new infrastructure requirements. As such, PON is becoming an attractive fiber-based LAN edge network solution for enterprises. Some of the key benefits PON brings to enterprise networks are: significant reduction in CapEx (capital expenditures) and OpEx (operating expenses), centralized control and management, high capacity, flexible deployment, and strong physical and communication security. However, nowadays PON products are still not automated and need human intervention for management. As such, one or more embodiments advantageously satisfy the new enterprise network requirements for automated and smart network management through software-enabled control.

One or more embodiments provide a novel approach for dynamic capacity management of PON that achieves dynamic capacity allocation depending on the traffic load in the network. More specifically, first, formulate the solution as a joint PON deployment and online traffic steering problem in a PON enterprise network. As the formulated problem is NP-Hard, one or more embodiments employ a heuristic algorithm that achieves capacity steering in response to traffic surges and mobility in the network. Amokrane Ahmed, Hwang Jinho, Xiao Jin, and Anerousis Nikos, "Software Defined Enterprise Passive Optical Network," in 1*st International Workshop on Management of SDN and NFV Systems*, (*ManSDN/NFV* 2014), Rio de Janeiro, Brazil, November 2014, expressly incorporated herein by reference in its entirety for all purposes, showed the feasibility of achieving programmability in PON networks. One or more embodiments provide an approach for dynamic capacity steering in PON that can handle variable traffic patterns in real-time. More specifically, one or more embodiments provide:

Capacity pool based deployment of PON: one or more embodiments address the idea of deploying PON network based on capacity pools (capacity pool is defined as a set of network capacity resources (e.g., ports and fibers) shareable across different areas that the network covers). Analogous to systems design, imagine a capacity pool as a pool of CPUs dedicated to a set of end users, and the association of CPUs to users is determined at runtime depending on their workload requirements. In this fashion, network resource over-provisioning is reduced and local peak surges can be tolerated at a higher level. Moreover, as capacity pools are realized through a crisscross design of the network physical connectivity, the network is more resilient, inasmuch as an area has multiple disjoint paths between the end device and the core.

Dynamic traffic steering in response to surges in traffic in the network: one or more embodiments provide a reactive algorithm for traffic steering in the PON network to accommodate surges in traffic in some parts of the network, analogous to runtime association of CPUs to end users based on their workload requirements. The traffic steering utilizes the multi-path connectivity in a capacity pool (both fibers and ONTs) as to make use of the shared capacity in the network.

SDN integration for PON management in an Enterprise environment: one or more embodiments provide an architecture that integrates GPON management with an SDN controller. This integration is a precursor towards a full end-to-end management in enterprise networks that includes the core network.

Real deployment in a PON testbed: an exemplary embodiment was deployed for experimental purposes in a GPON testbed at IBM T.J. Watson Research Center, New York. The deployment includes a central Java code module for dynamic capacity and traffic steering in the network.

Note that theoretically, it is possible to have a single capacity pool for the entire enterprise for maximum flexibility in capacity management. However, this design will require very large number of fibers and ports to form a complete graph of crisscrossed physical connectivity, a costly and complex solution. Therefore, an interesting and nontrivial problem, addressed herein, is determining how many capacity pools are needed and which areas each capacity pool should cover, depending on expected mobility patterns and load density distribution in a specific enterprise environment.

II. Passive Optical Networks and Software Defined Networks

A. Passive Optical Networks

A Passive Optical Network (PON) includes a set of Optical Network Terminals (ONTs), passive splitters and the Optical Line Terminal (OLT). The ONTs connect edge devices to the PON network via Ethernet ports, also called User Network Interfaces (UNI). Digital signals from edge devices are converted to optical signal in the ONT. The optical splitters split the light signal multiple ways to ONTs and transmit the multiplexed signal to the OLT. The OLT aggregates all optical signals from the ONTs and converts them back to digital for the core router. The OLT may support a range of built-in functionalities such as integrated Ethernet bridging, VLAN capability and security filtering. Compared with traditional copper networks, PON replaces switches in the access and aggregation layers with splitters, and the traditional distribution layer is collapsed back to a few OLTs. An OLT may support 8-72 fiber ports, with each port connecting a fiber cable to the splitter. The splitter can support different splitting ratios with 1-32 or less being the recommended ratio. Therefore each OLT port can potentially support 32 ONTs. Different ONT configurations are available ranging from 2 to 24 Ethernet ports. Enterprise PON uses the following ITU-T Gigabit PON (GPON) standards, all expressly incorporated herein by reference in their entireties for all purposes:

ITU-T Gigabit capable Passive Optical Networks (GPON). General characteristics. ITU-T G.984.1, 2008.

ITU-T Gigabit capable Passive Optical Networks (GPON). Transmission convergence layer specification. ITU-T G.984.3, 2008.

ITU-T Gigabit capable Passive Optical Networks (GPON). ONT management and control interface specification. ITU-T G.984.4, 2008.

Note that PON and GPON are used interchangeably herein.

Compared to traditional copper networks, a PON has a number of salient advantages. The optical fibers in a PON can travel up to 20 Km from the core to the access, capable of delivering 1.2 Gbps upstream and 2.4 Gbps downstream to the port in the current generation, and the fiber is much lighter than copper cables. Moreover, PON eliminates active equipment in the distribution resulting in significant CapEx and OpEx savings (up to 40% and 60% respective savings compared to traditional enterprise copper networks). Furthermore, PON offers much stronger security with enhanced data encryption and physical protection. More details on the enterprise PON technology and its benefits over traditional copper networks can be found in IBM Global Technology Services, Smarter Networks With Passive Optical LANS, *IBM Whitepaper*, 2013, expressly incorporated herein by reference in its entirety for all purposes.

Figure 4:
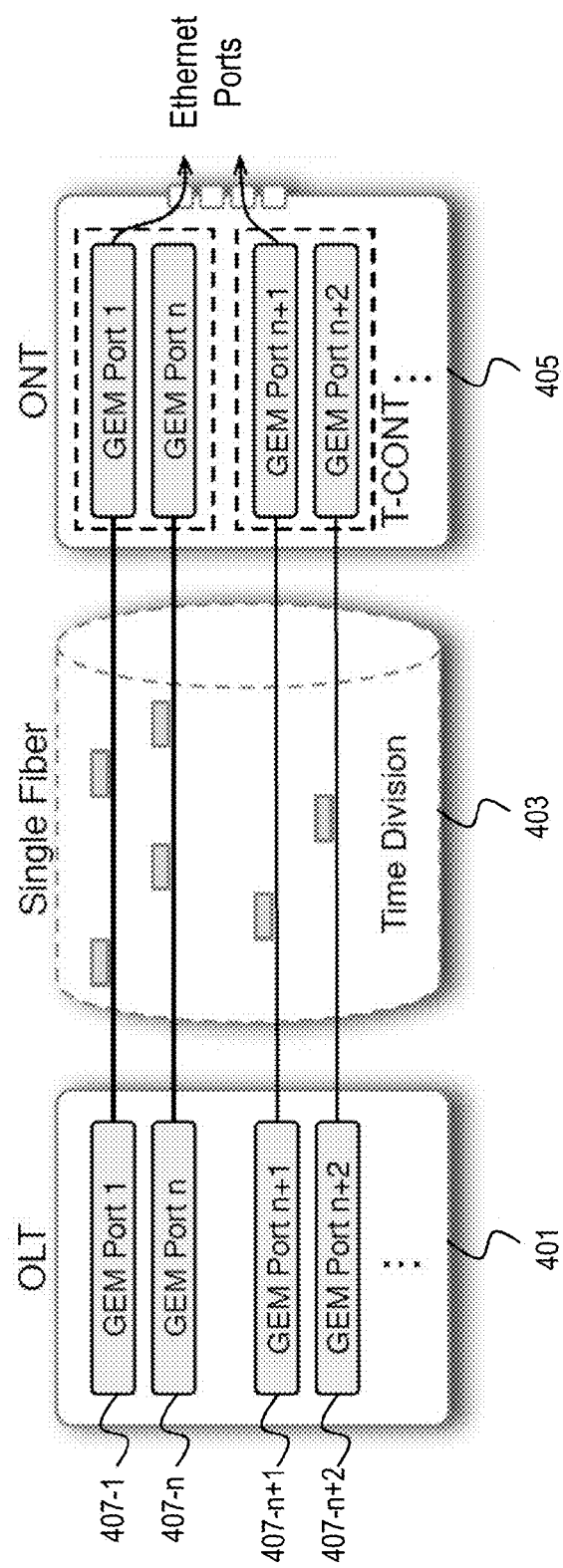
FIG. 4 presents an exemplary view of traffic management in GPON networks.

Referring to FIG. 4, the entire PON network constitutes an Ethernet LAN. Between the ONT 405 and the OLT 401, Ethernet frames are encapsulated in GTC Encapsulation Method (GEM) frames. Each GEM frame belongs to a GEM port 407-1 through 407-n+2. A GEM port represents a logical connection (channel) between an ONT and an OLT, with a class of service and a unique identifier. A typical architecture for traffic management in GPON is illustrated in FIG. 4. A Transmission Container (T-CONT) is an ONT object representing a set of GEM ports that appear as a single entity for the purpose of upstream bandwidth assignment on the PON. In the upstream direction, bandwidth allocation for ONTs is done in a TDMA manner (see 403) by the OLT, where each slot is allocated for a given T-CONT. More specifically, users' Ethernet frames are assigned N-VLAN tags (Network VLAN) and CoS (802.1p) values based on Physical Port of the ONT, Subscriber VLAN ID, 802.1p bits and/or DSCP, as defined by the ITU-T GPON standard. Each of the N-VLAN and CoS combinations is mapped to a specific GEM port. The QoS of the T-CONT to which the GEM port belongs, applies to the frame for scheduling. In the downstream direction, traffic is transmitted in a TDM manner, where each ONT forwards the traffic to the appropriate GEM port.

B. Software Defined Networks

SDN has recently emerged as new norm for networks. In a nutshell, SDN relies on (i) decoupling the control plane from the data plane, (ii) logically centralized controller and (iii) a standard protocol, such as OpenFlow, for communication between the controller and the forwarding elements in the network. Regarding OpenFlow, refer to Nick McKeown, Tom Anderson, Hari Balakrishnan, Guru Parulkar, Larry Peterson, Jennifer Rexford, Scott Shenker, and Jonathan Turner, OpenFlow: Enabling innovation in campus networks. *SIGCOMM Com-put. Commun. Rev.,* 38(2), Mar. 2008, expressly incorporated herein by reference in its entirety for all purposes. SDN has first been proposed for data center networks, with mainly an Ethernet copper-based switching fabric. As an SDN offers flexibility, manageability and agility, a number of proposals advocate extending SDN for wireless networks; for instance cellular networks, WLANs, Wi-Fi-based networks, wireless mesh networks, and campus copper based networks. Moreover, one active and interesting effort is to extend SDN to optical networks. The objective is to ease management and flexibility that are often rigid and cumbersome. In enterprise networks, SDN helps to address the problems of flow control, network load balancing and performance management (quality assurance and congestion control), required by increasingly heterogeneous, mobile and dynamic user traffic profiles.

On the other hand, optical networks are becoming an attractive solution as they offer higher capacity and reduced OpEx and CapEx. Logically, SDN should eventually be extended to incorporate PONs in the years to come. In fact, the Open Networking Foundation (ONF) created The Optical Transport Working Group (OTWG). The OTWG will work towards identifying use cases, defining a target reference architecture for controlling Optical Transport Networks (OTNs) incorporating OpenFlow, and identifying and creating OpenFlow protocol extensions. Commentators have identified some of the key requirements, benefits and challenges of extending SDN concepts to OTNs. However, these works focused on OTNs, which are capable of active switching and use GMPLS for creating virtual circuits on top of the optical backbone, and did not address the challenging aspects of PONs. In one work introducing the SDN paradigm in PONs, the authors proposed extensions to the OpenFlow protocol, mainly on mapping flows (as defined by the OpenFlow standard) to GEM ports, in addition to pushing and popping VLAN tags from the packets. Such a proposal requires changes in the ONTs and OLTs to be implemented. Additional works consider the specific requirements of ISP GPON-based networks, and have also proposed hints for integrating SDN in optical networks. However, the dynamic and mobility pattern of enterprise network traffic and the need for agility have not been addressed in this work. PONs have also been studied in the context of intra-data center networks. For instance, commentators have proposed an SDN oriented architecture for data center networks to replace the switches at the edge and aggregation layers. More specifically, it has been proposed to add SDN capabilities to the deployed ONT and introduce a Top of Rack (ToR) device to each wavelength allocation for the different ONTs. Moreover, network coding is used to further increase the network capacity. Such a design enables flexibility in the wavelength allocation, which can be leveraged to achieve high bandwidth utilization in the fibers. However, this proposed architecture introduces changes to the current PON networks on the market.

One or more embodiments of the invention, however, provide an architecture that takes into account the current PON implementations of the standard without introducing any changes. As one or more embodiments are oriented towards deployment with currently-available PON products, they provide a plug and play solution that can be easily integrated to any PON. In Amokrane Ahmed, Hwang Jinho, Xiao Jin, and Anerousis Nikos, "Software Defined Enterprise Passive Optical Network," in 1*st*International Workshop on Management of SDN and NFV Systems, (*ManSDN/NFV* 2014), Rio de Janeiro, Brazil, Nov. 2014 (hereinafter, "Amokrane SDEN paper"), the design of a Software Defined Edge Network (SDEN) was presented, which brings agility and programmability to GPON networks. In one or more embodiments of the invention, an approach is provided for dynamic traffic steering in response to traffic load in the network, reusing pertinent aspects from just-mentioned Amokrane et al., which are related to traffic steering, service dimensioning and realtime re-dimensioning.

III. Software Defined Edge Network and the Supporting Mechanisms

A. Software Defined Edge Network (SDEN) Architecture

Figure 5:
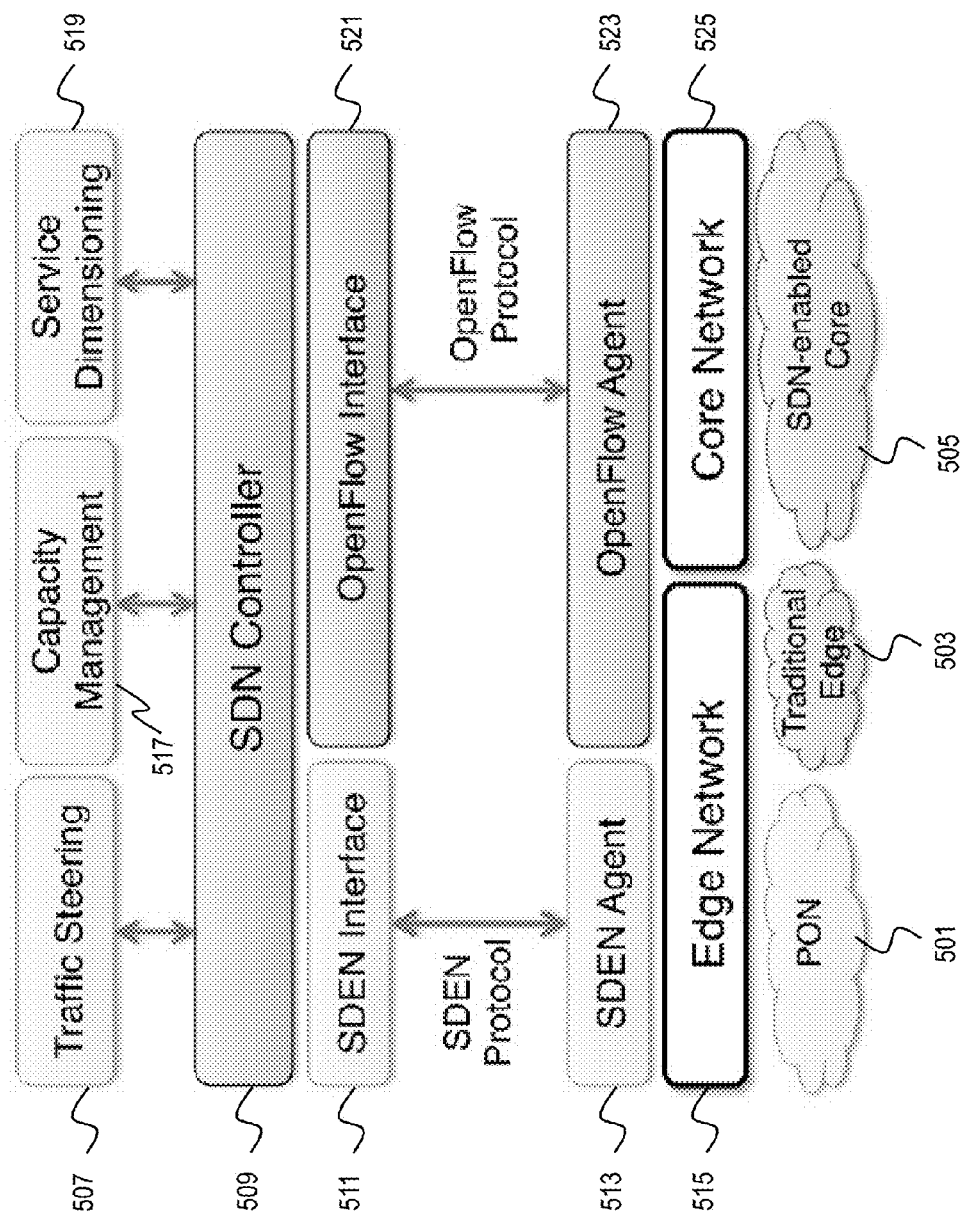
FIG. 5 presents an exemplary view of software defined edge network extension with PON, according to an aspect of the invention.

SDEN was proposed in the Amokrane SDEN paper. One or more embodiments build on same to provide dynamic traffic steering on top of the SDEN framework. The SDEN architecture is illustrated in FIG. 5. It defines a common interface through APIs 511, 521 between the controller 509 and the PON nodes (OLT) 501. A PON does not support OpenFlow currently; one or more embodiments provide an interface used as a bidirectional high level interface. More specifically, the interface provides a standardizable and vendor neutral set of functionalities that a controller can use. On top of the controller, different applications for network management and optimization are possible. For instance, one or more embodiments provide an application that performs dynamic traffic and capacity steering in PON. As such, the network statistics and status are pulled from the application through the SDEN Agent API 513. Similarly, the decision on traffic routing and capacity steering computed by the application are also passed through the SDEN Agent to the OLT. However, as PON is a Layer 2 network, the traffic control is performed at aggregate level encompassing multiple Layer 3 and above flows. Capacity dimensioning and traffic steering are achieved via the configuration of ONT and the association of optical ports at OLT to ONTs.

Still referring to FIG. 5, SDN controller 509 takes as inputs traffic steering 507, capacity management 517, and service dimensioning 519. Edge network 515 can include a PON or a traditional edge 503. Just as SDEN interface 511 interfaces with SDEN agent 513 using SDEN protocol, OpenFlow interface 521 interfaces with OpenFlow agent 523 using OpenFlow protocol. Core network 525 can include, for example, an SDN-enabled core 505.

B. Traffic Steering Enabling Mechanisms

In PON, each OLT is connected to ONTs through a passive splitter. Each ONT has a set of Ethernet ports, or User Network Interfaces (UNI). The OLT management entity enables the Ethernet ports to allow traffic to flow from the UNI to the core network, and achieves user traffic mapping into VLANs managed in the PON. More specifically, a Network Access Control (NAC) profile is assigned to each Ethernet port. The NAC profile defines, among other things, a service profile associated with it. Each service profile describes how traffic is tagged (associated VLAN tag), the committed and peak rates, and the traffic priority. Multiple service profiles can be associated with a single Ethernet port. In this case, user VLAN tags are used to identify the traffic belongs to a specific service profile. For instance, an IP phone can tag the traffic and the regular laptops do not tag traffic. As such, the tagged traffic is mapped to the QoS guaranteed traffic in the PON, whereas the untagged traffic is mapped to a best effort service.

One or more embodiments use NAC-to-Ethernet port assignment to dynamically steer traffic. As PON is an L2 network, switching a user equipment from one Ethernet port to another by changing the NACs does not affect L3 (i.e., IP address) or high layer network constructs. Moreover, one or more embodiments enable/disable Ethernet ports to block or allow traffic to enter the PON.

IV. Problem Formulation

This section presents the mathematical formulation of the problem of joint deployment and traffic steering of an enterprise network, and also presents the specific case of traffic steering only, where the PON network is already deployed.

A. Joint Deployment and Traffic Steering in PON Enterprise Networks

This subsection presents the model for deploying the PON network to enable the creation of capacity pools and allow for dynamic traffic steering. The problem is formulated as an ILP where:

GIVEN

The physical location of the different areas

The estimation of the peak bandwidth demand in each area over time

FIND

The number of needed GPON ports and ONTs

The physical wiring of the ONTs to GPON ports

Direct enough capacity to each area to route its peak traffic demand

One or more embodiments assume the network is divided into areas. Such a division into areas of density to ensure coverage is one of the design recommendations of vendors. For instance, Cisco proposes deployment guidelines for WLAN to accommodate conference venues, and research proposals also suggest dividing the network into areas. Note that one or more embodiments are not directed to the deployment inside each area, but rather to the PON backbone network for traffic routing in the network. Given the teachings herein, the skilled artisan will be able to develop examples and strategies for deploying Wi-Fi APs in each area; see, e.g.:

Florwick Jim, Whiteaker Jim, Cuelar Amrod Alan, and Woodhams Jake, Wireless LAN design guide for high density client environments in higher education, *Cisco Design Guide*, Nov. 2013; and WiROI, WiROI Venue Tool, available at www dot wireless2020 dot com slash WiROIVenue slash (dots and slashes rendered in prose to avoid introduction of browser-executable code);

both expressly hereby incorporated herein by reference in their entireties for all purposes. Note that the problem of WAP-to-ONT association is solved by using L2 unmanaged switches. In fact, the number of WAPs per area can easily be wired through switches to offer the possibility to dynamically route the traffic and choose which ONT ports to use. For simplicity of the problem definition, this aspect is not expressly included herein. Again, techniques for the physical wiring of the switches to ONTs and WAPs to ONT will be clear to the skilled artisan, given the current state of the art and the teachings herein. However, note that the deployment guarantees enough capacity for such wiring.

The following presents the mathematical formulation of the problem. For ease of understanding, see Table I of FIG. 6, with a list of variables used in the problem formulation.

The network is divided into areas A. Assume that time is divided into time slots, and during each time slot t∈T, the traffic load of each area is fixed. At the end of each time slot t, the traffic demand in each area might change. This change may be due to density shift or additional users joining the network. As such, define the traffic demand in area r∈R as $D_{r,t}$.

The network includes a set of n ONTs denoted by N, and a set of m GPON ports denoted by P. Each of the ONTs is connected to one and only one GPON port k∈P through a splitter, where $S_k$ is the splitting ratio of the splitter connected to GPON port k, and $C_k$ is the bandwidth capacity of GPON port k.

The problem in the deployment phase is to find the minimum number of ONTs and GPON ports that are necessary to deploy and the association of ONT-GPON port(s) in such a way as to guarantee enough capacity for the peak demand in each area. The capacity steering includes assigning GPON ports to areas in such a way as to accommodate the traffic demand from each area during each time slot t.

Define also two decision variables:

$$u_{r,j,t} = \begin{cases} 1 & \text{If } ONT \ j \text{ is used to route the traffic} \\ & \text{of Area } r \text{ during time slot } t \\ 0 & \text{Otherwise} \end{cases} \quad (1)$$

$$x_{j,k} = \begin{cases} 1 & \text{If } ONT \ j \text{ is attached to } GPON \text{ port } k \\ 0 & \text{Otherwise} \end{cases} \quad (2)$$

The objective is to minimize the number of deployed ONTs and used GPON ports while guaranteeing the traffic is drained. Define whether an ONT j is deployed or not by the following variable $y_j$:

$$y_j = \begin{cases} 1 & \text{If } \sum_{t \in T} \sum_{r \in R} u_{r,j,t} \geq 1 \\ 0 & \text{Otherwise} \end{cases} \quad (3)$$

Define also the variable $b_{j,r}$ which determines whether an ONT is deployed in an area r∈R. It is defined as follows:

$$b_{j,r} = \begin{cases} 1 & \text{If } \sum_{t \in T} u_{r,j,t} \geq 1 \\ 0 & \text{Otherwise} \end{cases} \quad (4)$$

Define $d_{k,r}$ that determines whether GPON port k can be assigned, through a deployed ONT that is attached to GPON port k.

$$d_{k,r} = \begin{cases} 1 & \text{If } \sum_{j \in N} b_{j,r} \times x_{j,k} \geq 1 \\ 0 & \text{Otherwise} \end{cases} \quad (5)$$

Similarly, define the variable $z_k$ that determine whether a GPON port k∈P is used or not as follows:

$$z_k = \begin{cases} 1 & \text{If } \sum_{j \in N} x_{j,k} \times y_j \geq 1 \\ 0 & \text{Otherwise} \end{cases} \quad (6)$$

The objective function is defined as follows:

$$\text{Minimize} \left( \beta_{pon} \sum_{k \in P} z_k + \beta_{ont} \sum_{j \in N} y_j \right) \quad (7)$$

where $\beta_{pon}$ and $\beta_{ont}$ are the costs of deploying a PON port and an ONT, respectively.

This problem is subject to the following constraints:

An ONT is deployed in one and only one area:

$$\sum_{r \in R} b_{j,r} \leq 1 \quad (8)$$

The number of ONTs that maybe assigned to a single GPON port are limited by the splitting ratio of the GPON Network $$\sum_{j \in N} y_{j,k} \leq S_k, \forall k \in P \quad (9)$$

where $S_k$ is the maximum number of ONTs that might be connected to the GPON port k.

For an Area r∈R that has traffic to transmit during time slot t, there are enough paths towards GPON ports $$\sum_{k \in P} d_{k,r} \times C_k \geq D_{r,t}, \forall t \in T \quad (10)$$

where $C_k$ is the capacity of GPON port k.

The capacities of the GPON ports should not be exceeded $$\sum_{j \in N} u_{r,j,t} \times D_{r,t} \times y_{j,k} \leq C_k, \forall t \in T \quad (11)$$

Note that this deployment problem is solved only at the deployment stage. It would be reasonable to use any solver such as ILOG CLPEX to solve it. However, the traffic and capacity steering is dynamic and is achieved in response to the traffic pattern change in the network. Therefore, a non-time-consuming solution is advantageously provided by one or more embodiments, as discussed in the next section.

B. Traffic Steering in PON Enterprise Networks

The joint deployment and traffic string presented in subsection IV-A is solved at the deployment phase. During operations, as the traffic patterns might change, the traffic should be steered accordingly, given the fixed deployment topology. This section presents the modifications on the formulation in section IV-A to address traffic steering only.

As the deployment is already done, the variables $x_{j,k}$, $b_{j,r}$, and $d_{k,r}$ become input variables to the ILP. The only decision variable to determine is $u_{r,j,t}$, which defines which ONT is used to route the traffic from each area. Consequently, modify the objective function to take into account the operational costs. In this case, the objective is to minimize the number of ONTs and GPON ports used when routing the traffic. The objective function is defined as follows:

$$\text{Minimize} \left( \alpha_{ont} \times \left( \sum_{t \in T} \sum_{j \in R} u_{r,j,t} \right) + \alpha_{pon} \times \left( \sum_{k \in P} \sum_{t \in T} v_{k,t} \right) \right) \quad (12)$$

where $\alpha_{pon}$ and $\alpha_{not}$ are the costs of operating a PON port and an ONT during one time slot t, respectively, and $v_{k,t}$ is a binary variable that determines whether PON port k is used during a time slot t, and is defined as:

$$v_{k,t} = \begin{cases} 1 & \text{If } \sum_{r \in R} \sum_{j \in N} u_{r,j,t} \times x_{j,k} \geq 1 \\ 0 & \text{Otherwise} \end{cases} \quad (13)$$

V. Dynamic Traffic Steering in Capacity Pool Enabled Pon

The traffic in the network is dynamic and subject to end users' mobility. As the network experiences traffic load shift across areas, capacity is, in one or more embodiments, advantageously dynamically directed to the overloaded areas. Moreover, the network is, in one or more embodiments, advantageously reactive to the load shift. In addition to capacity steering, one or more embodiments integrate service dimensioning. In fact, under heavy traffic demands, low priority services are allocated less resources in the network. On the other hand, more resources are allocated to services with higher priority. From the implementation point of view, SDEN relies on Ethernet port allocation in each chosen ONT to serve an area. More specifically, a NAC profile is assigned to each Ethernet port. The NAC profile defines a service profile associated with it. Each service profile defines by itself how traffic is tagged (associated VLAN tag), the committed and peak rates and the traffic priority. For service dimensioning, use the committed rates of services to adjust the amount of allocated resources in the network.

As the problem defined in the previous section is NP-Hard, it becomes time prohibitive to solve. More specifically, in case of large networks and high traffic demand variability, the ILP should be solved very often, which can result in high computation overhead and slow response time to network changes. Consequently, a fast algorithm is advantageously provided by one or more embodiments. To do so, one or more embodiments employ a heuristic approach to find a feasible solution to allocated capacity to different areas in a reasonable time. First, perform a continuous monitoring of the GPON ports utilization and traffic demands in areas. Define two thresholds for the GPON ports utilization: $\gamma_{low}$ and $\gamma_{up}$, which determine the lower and upper bounds for under-utilized and over-utilized GPON ports. As such, a GPON port is considered under-utilized if its utilization is above $\gamma_{up}$, and under-utilized if its utilization is bellow $\gamma_{low}$. The algorithm for continuous monitoring is provided in Algorithm 1 in FIG. 7.

Algorithm 2 in FIG. 8 provides an algorithm for capacity allocation. Each area has traffic demand. Assume there are two classes of services: premium and best effort. Incrementally open Ethernet ports in areas to route traffic by allocating available capacities in the GPON ports. More specifically, non-used Ethernet ports are opened in the ONTs deployed in these areas. Note that the capacity was allocated by taking into account the capacity of the Ethernet and GPON ports. Moreover, prioritize the premium services over the best effort ones (see lines 6-12). Also, allocate the GPON ports to the areas in a best fit manner. In other words, for each area with traffic demand to route, choose an already opened GPON port that has enough residual capacity (see line 13). This will allow for traffic consolidation and open reduction as provided in objective function in equation (12).

Note that the advantage of this approach is that it completely transparent from an end user perspective. In fact, the entire PON is L2, and the IP address of the device remains the same while moving across areas.

VI. Performance Evaluation

Figure 9:
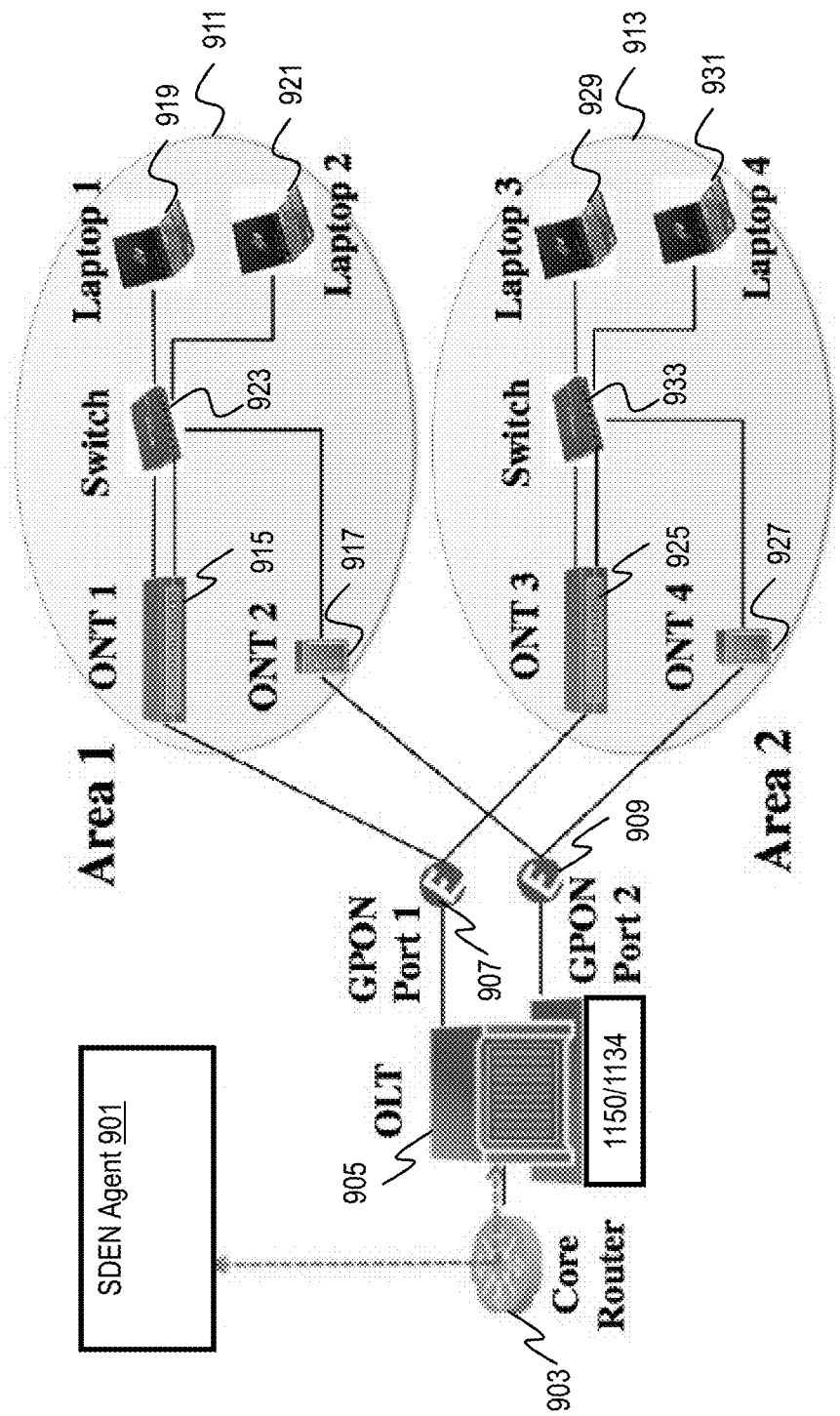
FIG. 9 presents an exemplary experimental setup, according to an aspect of the invention.

This section presents the non-limiting exemplary results of experiments in a real experimental testbed deployed at IBM T.J. Watson Research Center in New York. More specifically, the viability of dynamic capacity steering in managing mobile and dynamic traffic loads was studied. To this end, a simple network topology was created which is described below with reference to FIG. 9.

The experimental test scenario includes two areas, Area 1 911 and Area 2 913 under the same capacity pool. A crisscrossed physical deployment allows sharing two GPON ports (GPON port 1 907 and GPON port 2 909) between the two areas. Two ONTs are deployed in each area (ONTs 915, 917 in area 911 and ONTs 925, 927 in area 913), and each of these two is connected to a different GPON port. Two laptops are used in each area to generate the traffic; laptops 919 and 921 in area 911 and laptops 929 and 931 in area 913. The testing setup illustrated in FIG. 9 also includes switch 923 in area 911 and switch 933 in area 913; OLT 905; core router 903; and SDEN Agent 901. The following shows how a non-limiting exemplary embodiment achieves dynamic capacity steering to allocate capacity to areas depending on the traffic load.

A software service in Java monitors the link utilization in the network and runs Algorithm 1 and Algorithm 2. The thresholds $\gamma_{low}$ and $\gamma_{up}$ were set to 2 MBps and 12 MBps, respectively. Moreover, the capacity of the GPON ports was scaled down to 16 MBps in order to generate traffic overload conditions in the test environment. The traffic load generated by the laptops in the two areas varies over time are shown in FIG. 10A. See also the traffic routing through the two ONTs in each area in FIGS. 10B and 10C.

The traffic load on the two GPON ports is shown in FIG. 10D, and the capacity allocation of the GPON ports to the different areas is shown in FIGS. 10E and 10F. Note that the interval of time of interest (t∈[800, 2000]) was plotted, where traffic variations were observed. As can be seen, GPON card 1 is the primary carrier while GPON card 2 is the secondary carrier. When traffic load on GPON card 1 threatens to overload, GPON card 2 is active to offload some of the traffic. Furthermore, observe that Area 1 starts with a heavy traffic load but peters out over time, while Area 2's load increases over time. This example describes real life scenarios (e.g., a stadium during a game) where a high density crowd migrates over time. More specifically, for t∈[800, 840], both GPON port 1 and GPON port 2 are used. However, these two ports experience under-utilization. As such, traffic is consolidated to GPON port 1 (see t∈[840, 960]). At t=960, Area 1 experiences a surge in traffic. In response, traffic of Area 2 is re-routed through GPON port 2. As such, GPON port 1 serves Area 1 exclusively and GPON port 2 serves Area 2. As the traffic surge continues in Area 1, more capacity in the GPON ports is needed. As such, at t=1030, part of the traffic of Area 1 is routed through GPON port 1 and another part is routed through GPON port 2. In other words, more capacity is directed to Area 1 to cope with the surge in traffic. Again, traffic is consolidated to GPON port 1 only around t=1400. At t=1620, traffic starts to shift from Area 1 to Area 2. The traffic surge in Area 2 triggers capacity allocation to Area 2. As such, both GPON ports are used to route the traffic of Area 2 (see t≥1680).

It is worth noting that one or more embodiments consolidate GPON cards when resource utilization is low in order to reduce operational costs. The fact that shared capacity can be dynamically allocated across areas when needed achieves both high local peak tolerance as well as high resource multiplex gain. This design is effective in managing migratory and volatile traffic load at the edge (e.g., WAPs connected to ONTs rather than laptops).

VII. Additional Details and Recapitulation

One or more embodiments address PON deployment and dynamic capacity steering in enterprise networks, and provide a framework that introduces programmability and dynamic adaptation for GPON networks in response to traffic shifts in the network. One or more embodiments provide an ILP formulation for the problem of deployment and dynamic traffic steering and capacity allocation. To alleviate the time complexity of solving the ILP in large networks, one or more embodiments employ a heuristic algorithm that achieves traffic steering on existing GPON deployments. Non-limiting experimental data demonstrates capacity steering though GPON port allocation to areas in the network depending on their traffic load.

Consider that by 2015, the world's mobile worker population will reach 1.3 billion (37% of the total workforce), more than 75% in the US; furthermore, 7.3 billion mobile devices existed in 2014. The increased adoption of PON by enterprises arises because it is simple, stable, scalable and secure. PON replaces active NEs in the aggregation and distribution layers with passive optical splitters. Static deployment and manual provisioning and configuration are currently needed for specific connectivity and workload requirement (complex and slow to change).

Figure 11:
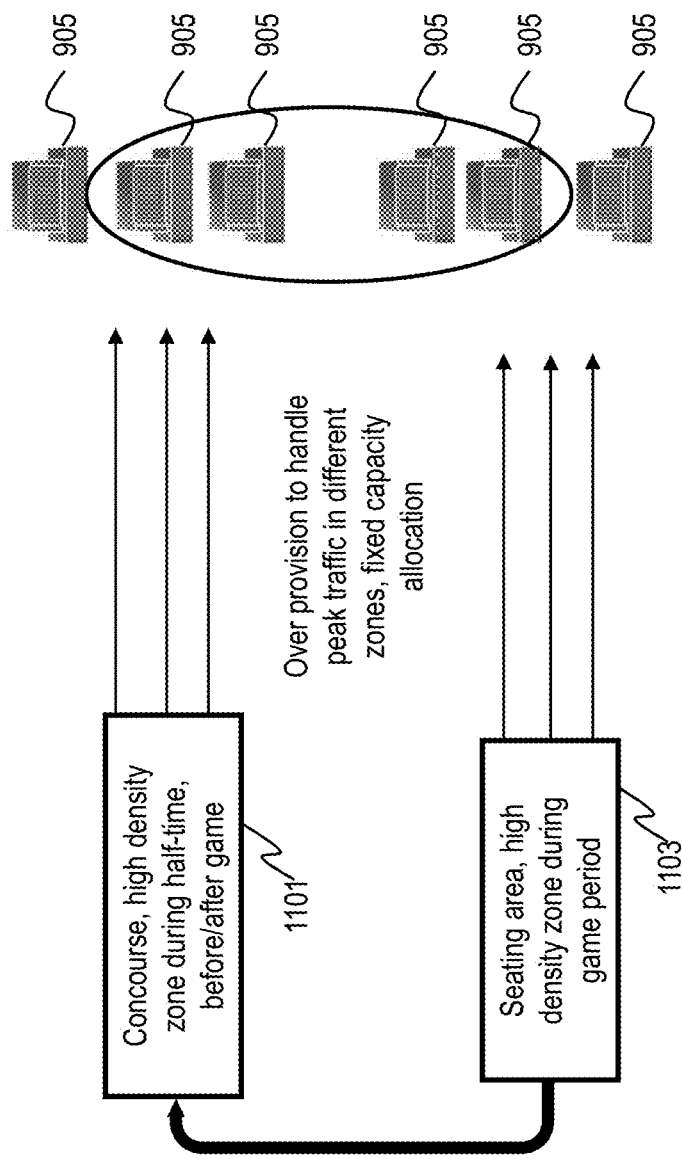
FIG. 11 presents an exemplary current stadium solution.

Consider a stadium example use case. Traffic (primarily mobile) is dynamic and migratory with high Peak-to-average ratio density shifts among stadium sectors depending on phase of a game. Transient traffic surge is likely due to synchronicity of a sudden event (e.g. a touchdown by home team). FIG. 11 shows a current solution, namely, overprovisioning of OLTs 905 to all density areas (here, concourse 1101 and seating area 1103). This is rigid and expensive. Hosting different venues (e.g., concert vs. sporting event) requires manual rewiring and reconfiguration of the network. This is a slow manual process, error-prone, and not optimized. It is static, and unable to change in real-time.

Consider a software-defined edge network. Mobility management requires more flexible network control and response. Software-defined automation can perform network management tasks in seconds at lower cost than conventional techniques. A programmable network using software defined control enhances PON with agility and dynamic configurability. Regarding edge dynamic control, steering takes into account how workloads are distributed across NEs and fibers to optimally support changing traffic patterns and provide load balancing capability. Dimensioning defines how capacity can be assigned to workload depending on business and service requirements, in order to guarantee performance, more efficient network utilization and increased reliability.

One or more embodiments provide a design that achieves real-time adaptation and mobile traffic management in PON through software-defined dynamic traffic steering and dimensioning. One or more embodiments optimize network connectivity, capacity allocation and sharing based on enterprise service requirements so as to minimize CAPEX while maximizing peak tolerance. A novel Capacity Pool design is provided in one or more instances, which directs network capacity to handle workload surges in local areas for improved performance and increased reliability. A dynamic traffic steering mechanism for PON is provided in one or more embodiments, which load balances mobile traffic, and achieves efficient resource utilization. A dynamic service dimension mechanism for PON is provided in one or more instances, which differentiates service performance and guarantees QoS, while ensuring network quality for premium services despite bursty and/or congestive network states. One or more embodiments also provide a central management component that can be integrated with SDN to achieve end-to-end manageability and/or API specifications between the SDN controller and the PON network elements.

Figure 12:
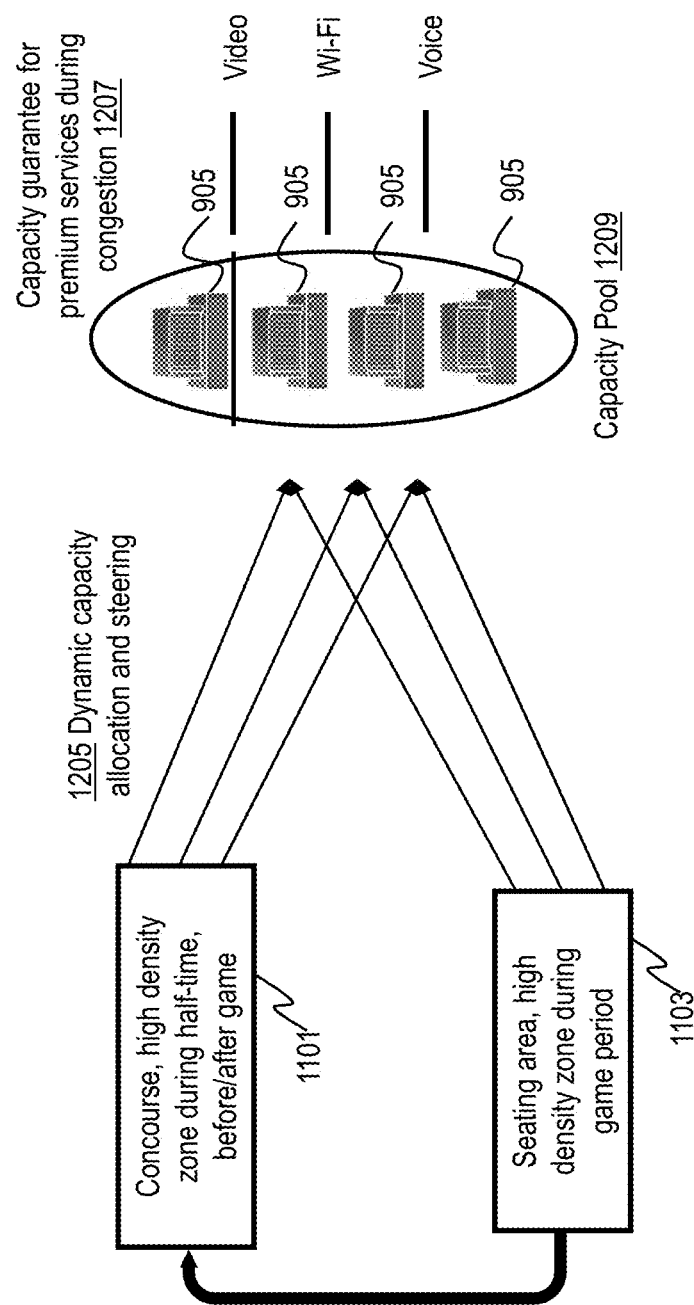
FIG. 12 presents an exemplary stadium solution, according to an aspect of the invention.

FIG. 12 shows an exemplary stadium solution in accordance with an aspect of the invention. SDEN is used for cost effective performance and mobility management. As seen at 1205, support mobility and density shifts with dynamic traffic steering and dimensioning. Capacity and performance management are provided for differentiated services (e.g., video, Wi-Fi, and voice), with quality assurance under a congestive state, as seen at 1207. The OLTs 905 form a capacity pool 1209, which is more flexible, adaptive and reduces overprovisioning cost. Each service is provisioned individually to guarantee capacity and performance.

Figure 13:
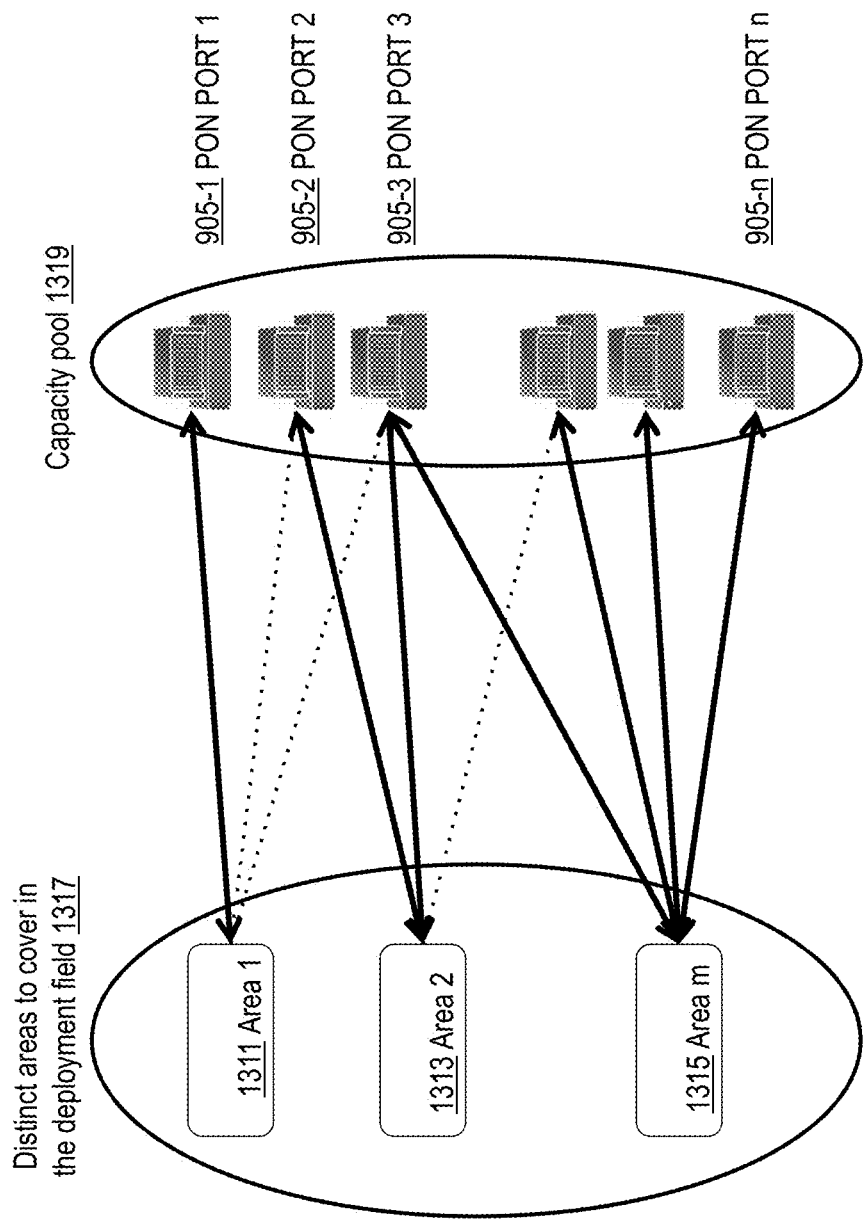
FIGS. 13-14 present exemplary traffic steering, according to aspects of the invention.

Refer now to FIG. 13, noting PON Ports 1 to n numbered 905-1 to 905-n, forming capacity pool 1319. An OLT can host multiple GPON cards. Each GPON card contain a set of PON ports. Dotted lines represent PON port to Area connectivity while PON port to Area Assignment at time t is shown in solid lines. One or more embodiments direct capacity to a specific area as needed. An area constitutes one or more WAPs. A capacity pool is shared across multiple areas along a mobility pattern. An area is served by a capacity pool. All PON ports are dynamically assigned to areas (i.e., traffic carrying, not as failover). Traffic is steered dynamically based on area demands using PON configuration mechanism (e.g., VLAN, ONT port activation, NAC, etc.). As seen at 1317, distinct areas 1 through m, 1311, 1313, 1315, are provided to cover in the deployment field.

Figure 14:
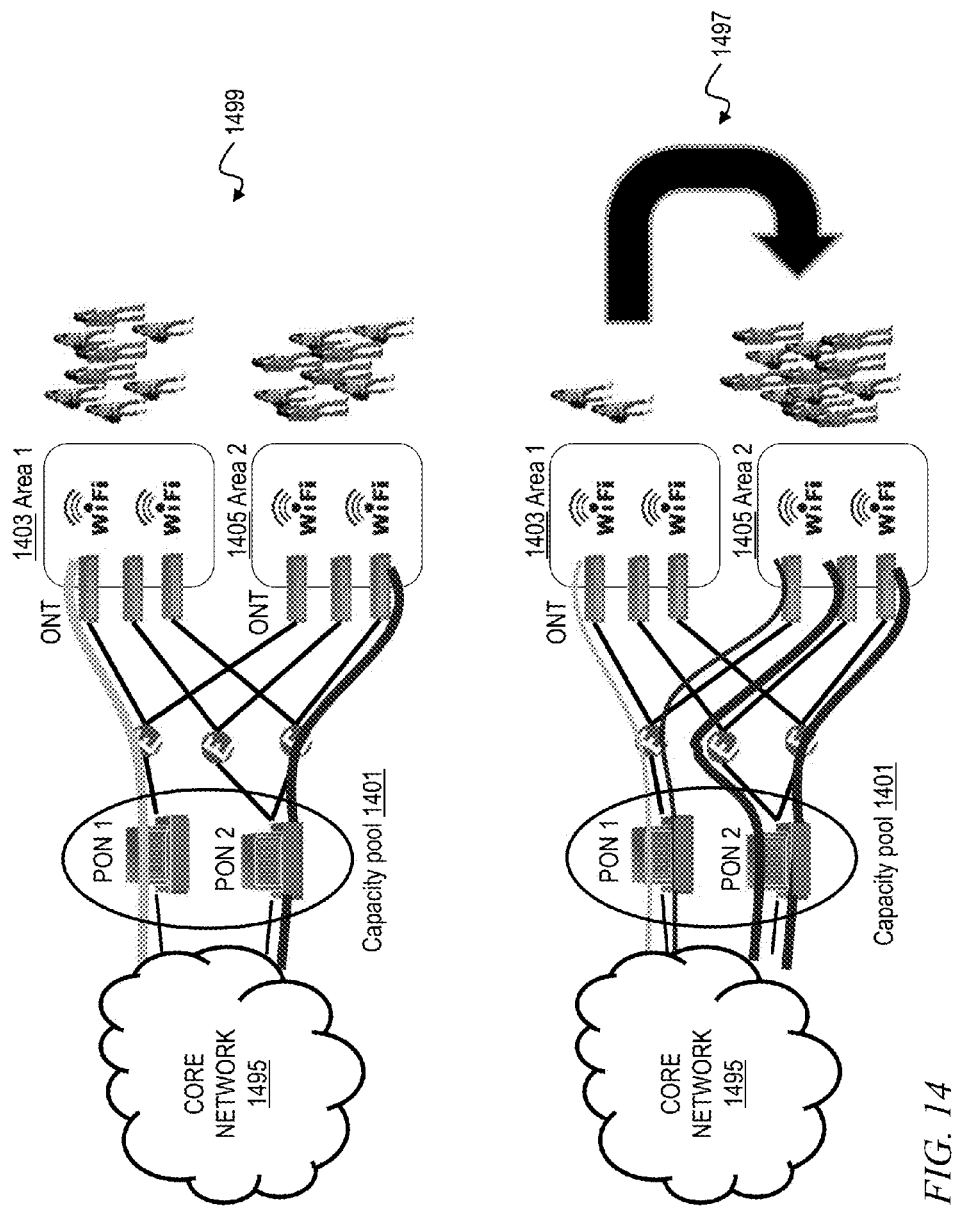

Referring now to FIG. 14, multiple paths from end devices to the core network 1495 are provided (an area 1403, 1405 has access to multiple ONTs, not separately numbered). A path is defined by VLAN identification, priority, ONT port, and NAC permission (a manual process today in PON). PON1 and PON2 form a capacity pool 1401. In this example, traffic load shifts due to mobility. Initially, at 1499, the areas are balanced; then, at 1497, area 1 requires less capacity and area 2 requires more. More ONT ports are activated automatically in area 2. More paths are created from area 2 to PON ports by automatically defining VLANs and NAC. PON ports are reconfigured to reallocate capacity to area 1 and area 2 as needed.

Figure 15:
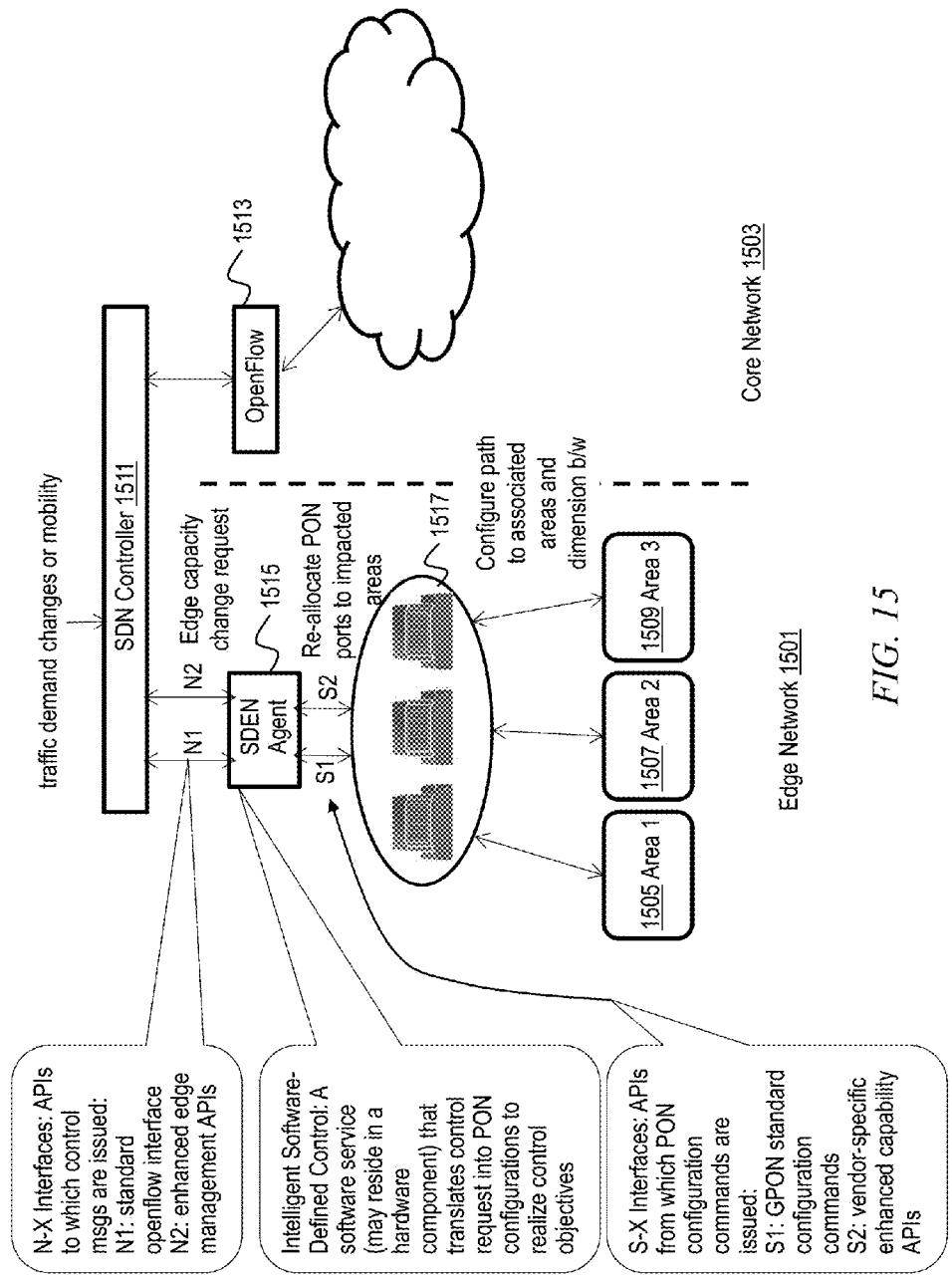
FIG. 15 presents an exemplary embodiment of a software-defined edge control mechanism, according to an aspect of the invention.

FIG. 15 is an exemplary embodiment of a software-defined edge control mechanism. Note edge network 1501. SDN controller 1511 takes as input traffic demand changes and/or mobility. OpenFlow 1513 is used to provide an interface to the core network 1503. N-X Interfaces N1 and N2 are APIs to which control messages are issued. N1 is a standard OpenFlow interface while N2 includes enhanced edge management APIs. These APIs provide an interface between SDN controller 1511 and SDEN agent 1515, which provides Intelligent Software-Defined Control, a software service (may reside in a hardware component) that translates control requests into PON configurations to realize control objectives. S-X Interfaces S1 and S2 are APIs from which PON configuration commands are issued. S1 employs GPON standard configuration commands while S2 provides vendor-specific enhanced capability APIs. Note capacity pool 1517; PON ports are re-allocated to impacted areas. Configure a path to associated areas (e.g., area 1 1505, area 2 1507, area 3 1509) and dimension bandwidth.

Regarding interface specifications, in the SDN Controller to SDEN agent interface (N1 and N2), the SDEN agent exposes two sets of interfaces to SDN controllers:

N1: implements standard OpenFlow v1.3 controller-switch APIs
  Handshake
  Switch configuration
  Flow configuration
  Modify state
  Packet-in and Packet-out
N2: implements GPON specific management capabilities via modified/added controller-switch APIs
  Steering req: change {<GPON Port #>, <ONT Port #>} to {<GPON Port #>, <ONT Port #>}
  Dimensioning req: <ONT Port #> set committed rate to X, peak rate to Y
  Multi-path config: set <ONT Port#> primary to <GPON Port #>, secondary to <GPON Port #>
  State check: ping <ONT Port #>.

Figure 16:
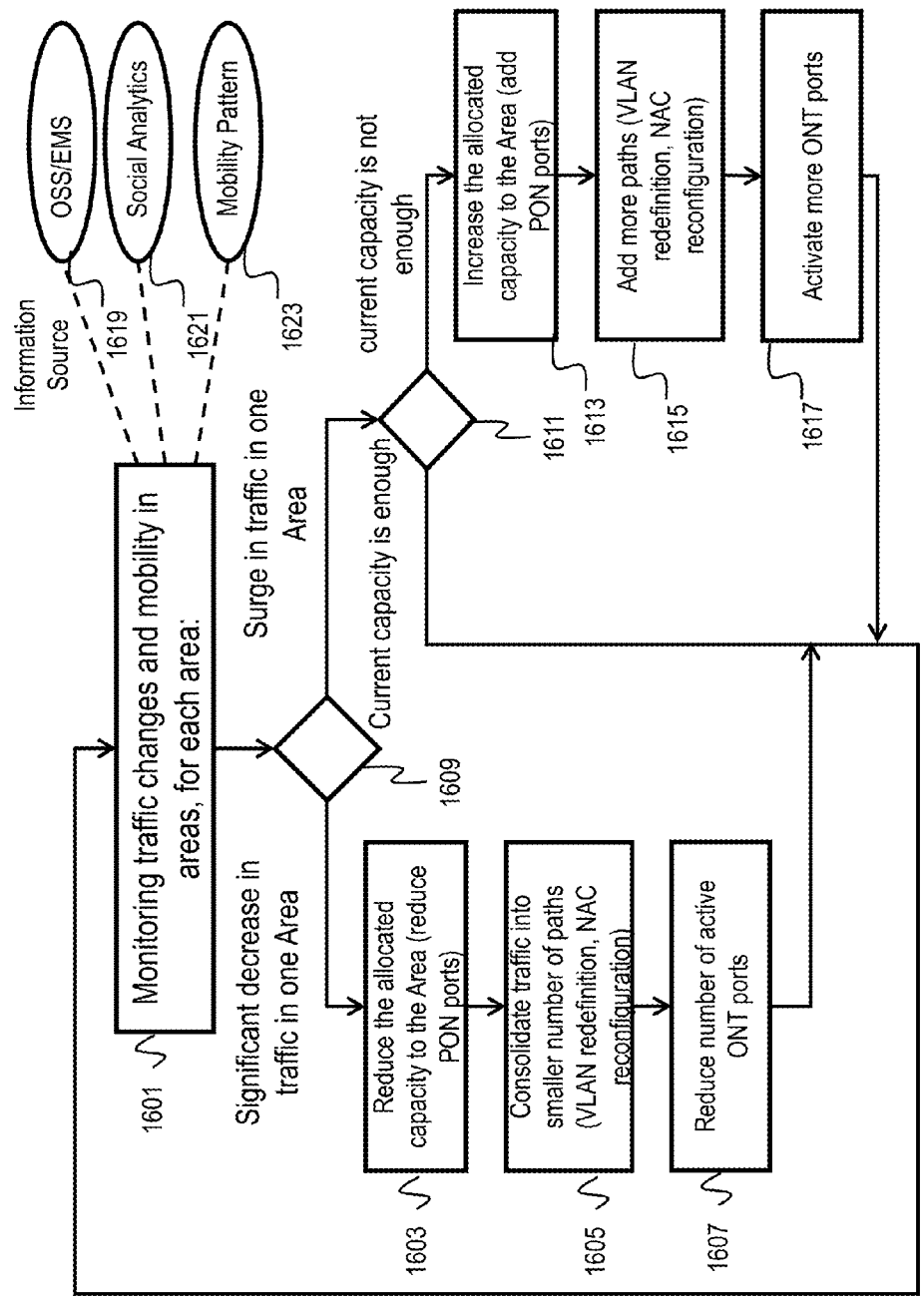
FIG. 16 presents an exemplary traffic steering decision process, according to an aspect of the invention.

In the SDEN agent to OLT CLI interface (S1 and S2): SDEN agent invokes two sets of interfaces on OLT CLI interfaces:

S1: utilizes standard GPON CLI commands all GPON OLT must support
  VLAN configuration: e.g., {<GPON Port #>, <ONT Port #>} set to <VLAN #>, <VLAN #>set priority to X
  Tag management: user traffic tagging, <s-vlan>to <n-vlan> mapping
  Traffic management: traffic shaping (<T-cont> configuration, DSCP to L2 priority mapping), <VLAN #> set committed to X, peak to Y
  ONT status mgmt: check <ONT Port #> status, open/close <ONT Ports>
  OLT status mgmt: check <GPON Port #>status, open/close <GPON Ports>
S2: implements vendor specific commands for enhanced management capability
  Access control (i.e., NAC): open/close <ONT Port #> for <VLAN #>
  Authentication: modify ACL table at OLT
  Failover: Set master and slave configuration at OLTs
  Statistic reporting: pull network metrics from OLT, network metrics from ONT FIG. 16 shows an exemplary traffic steering decision process. In step 1601, monitor traffic changes and mobility in areas for each are using sources such as OSS/EMS 1619, social analytics 1621, and mobility patterns 1623. A decision is made in block 1609 as to whether there has been a significant decrease in traffic in one area (left branch) or a surge in traffic in one area (right branch). If the former, reduce the allocated capacity to the area (reduce PON ports) in step 1603; consolidate traffic into a smaller number of paths (VLAN redefinition, NAC reconfiguration) in step 1605; and/or reduce the number of active ONT ports in step 1607. If the latter, proceed to block 1611 and determine if current capacity is enough (in which case simply continue to monitor) or not. If the latter case, increase the allocated capacity to the area (add PON ports) as in step 1613; add more paths (VLAN redefinition, NAC reconfiguration) as in step 1615; and/or activate more ONT ports as in step 1617.

FIG. 17 shows exemplary input 1701 and output 1703.

Consider dynamic service dimensioning. Each service has a QoS requirement in PON: committed rate and peak rate.

Continuous monitoring of the traffic per service in the network is carried out. Services are dimensioned to ensure:
  sustained rate is met and peak rate is handled
  sustained rate is guaranteed regardless of the network state
  Services are differentiated appropriately by priorities (e.g., low priority, premium, and the like)
Dynamic re-dimensioning happens when total sustained rate on a link exceeds capacity or total peak rate of premium services exceeds link capacity.
  Peak and sustained rates of low priority are modified dynamically to ensure QoS of premium services are met.
  Additional capacity is allocated from the pool (e.g., taken from low priority services) to meet the demand of premium services.
  Traffic steering make also occur to redirect high priority and low priority traffic along different paths.

Figure 18:
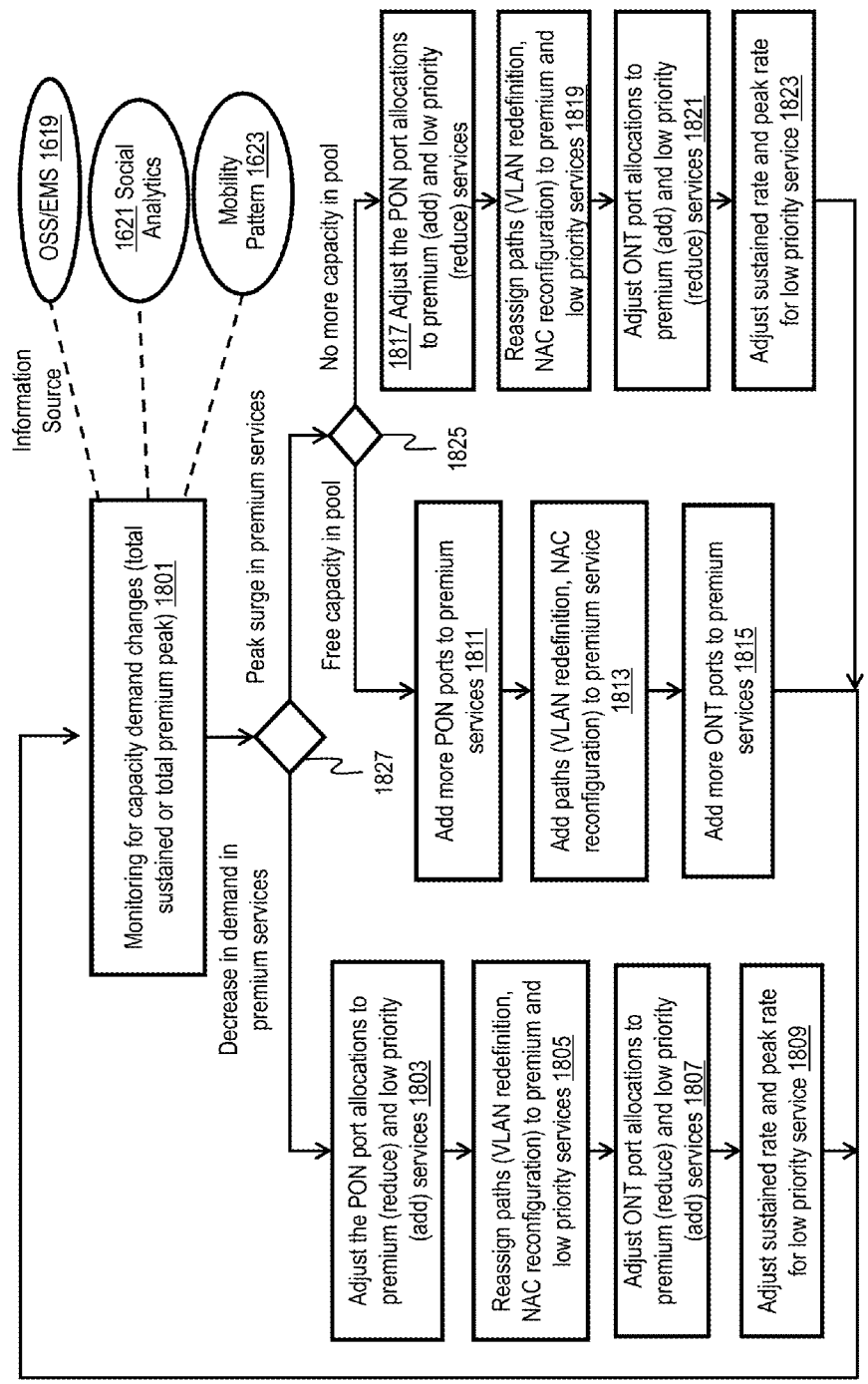
FIG. 18 presents exemplary service dimensioning and dynamic re-dimensioning, according to aspects of the invention.

FIG. 18 shows exemplary service dimensioning and dynamic re-dimensioning. In step 1801, monitor for capacity demand changes (total sustained or total premium peak) using sources such as OSS/EMS 1619, social analytics 1621, and mobility patterns 1623. A decision is made in block 1827 as to whether there has been a decrease in demand in premium services (left branch) or a peak surge in premium services (right branch). If the former, adjust the PON port allocations to premium (reduce) and low priority (add) services in step 1803; reassign paths (VLAN redefinition, NAC reconfiguration) to premium and low priority services in step 1805; adjust ONT port allocations to premium (reduce) and low priority (add) services in step 1807; and/or adjust the sustained rate and peak rate for low priority service in step 1809. If the latter, proceed to block 1825 and determine whether there is free capacity in the pool (left branch) or not (right branch). If the former case, add more PON ports to premium services in step 1811; add paths (VLAN redefinition, NAC reconfiguration) to premium service in step 1813; and/or add more ONT ports to premium services in step 1815. If the latter case, adjust the PON port allocations to premium (add) and low priority (reduce) services in step 1817; reassign paths (VLAN redefinition, NAC reconfiguration) to premium and low priority services in step 1819; adjust ONT port allocations to premium (add) and low priority (reduce) services in step 1821; and/or adjust sustained rate and peak rate for low priority service in step 1823.

One or more embodiments can have any one, some, or all of the following features:
  Dynamic and software-defined network control and management for enterprise PON to achieve mobile-centric load balancing and high reliability
  Interface specifications between the SDN controller and PON network elements
  Capacity pool as a novel concept in handling high peak-to-average and high migratory traffic while reducing network cost
  Multiple paths from a user equipment to the uplink in PON, that can be running at the same time for load balancing
  A software-defined method to optimally determine network connectivity and configuration based on mobility patterns and peak densities, to support diverse business requirements and guarantee performance
  Map L3 flow to L2 enterprise PON specifics to achieve end-to-end SDN manageability Thus, passive optical networks are observing rapid growth in the enterprise network market due to their simplicity, reliability, and low cost. However, the management of traffic and services in a PON follows traditional static network designs that are pre-configured for a specific workload. Today's enterprise traffic is becoming increasingly mobile (currently, more than 75% of the US work force is believed to be mobile, with 7.3 billion mobile devices at work). Mobile traffic is volatile and migratory, which requires dynamic control and management of the enterprise network for which PON is incapable of coping with today. One or more embodiments advantageously provide a design that achieves real-time adaptation of mobile traffic management in PON through software-defined dynamic traffic steering and dimensioning. Compared with current state-of-the-art PON solutions, the software-defined edge network allows for flexible network control and response specifically designed for enterprise mobility management and/or can perform network management tasks automatically in seconds rather than hours of manual administration currently required to reconfigure PON. Furthermore, the exemplary SDEN also enhances PON network with programmability and dynamic configurability, which allows for integration with core network SDN solutions in the future.

One or more embodiments:
  Optimize network connectivity design, capacity allocation and service dimensioning based on enterprise service requirements and mobility patterns so as to minimize CapEx while maximize local load peak tolerance
  provide a novel Capacity Pool design that directs network capacity to handle workload surges in local areas and mobile traffic migration across areas for improved performance and increased reliability
  provide a dynamic traffic steering mechanism for PON that load balances mobile traffic, and achieves efficient resource utilization and consolidation.
  provide a dynamic service dimension mechanism for PON that differentiates service performance and guarantees QoS, while ensuring network quality for premium services under highly variable network load conditions
  provide a central management component that can be integrated with SDN to achieve end-to-end manageability, and translate network management goals (both flow and capacity provision requests) into GPON native configurations.
  provide API specifications between the SDN controller and the PON network elements.

One or more embodiments provide a dynamic method of path rerouting and OLT-ONT re-configuration that can aggregate multiple OLT GPON ports into the same deployment area, does not require special purpose multi-homed ONTs, and/or can provide software-defined fail-over as one of the possible use cases. One or more embodiments overcome the limitations of fail-over and load handling features that require specialized physical PON components by providing software-defined steering capabilities without specialized hardware. One or more embodiments do not introduce deviation from the GPON standard TDMA communication technology, but rather adapt software-defined control to the existing GPON communication mechanisms. Hence, one or more embodiments provide a software-defined mechanism that is readily operable across current GPON standard access networks.

Given the discussion thus far, it will be appreciated that, in general terms, an exemplary method, according to an aspect of the invention, is carried out in a software-defined passive optical network including a set of optical network terminals 405, 915, 917, 925, 927; a set of passive optical network ports 905-1 through 905-n; and a plurality of splitters (e.g., attached to the ports at locations 905-1 through 905-n ). Each of the optical network terminals is connected to a single one of the passive optical network ports through a given one of the splitters. The software-defined passive optical network is divided into a plurality of areas 911, 913, 1101, 1103, 1311, 1313, 1315, 1403, 1405, 1505, 1507, 1509. Each of the areas is assigned a given fraction of the passive optical network ports. One step of the method includes monitoring passive optical network port utilization for each of the plurality of areas. A further step includes, for those of the areas determined in the monitoring step to have passive optical network port overutilization, increasing a number of the passive optical network ports assigned thereto. A still further step includes, for those of the areas determined in the monitoring step to have passive optical network port underutilization, reducing a number of the passive optical network ports assigned thereto. Refer to FIGS. 7, 8, 16, and 18.

In some cases, for those of the areas determined in the monitoring step to have passive optical network port overutilization, increase the number of paths thereto (e.g., 1615); and, for those of the areas determined in the monitoring step to have passive optical network port underutilization, reduce the number of paths thereto (e.g., 1605).

In some cases, the increasing and decreasing of the paths is accomplished at least via virtual local area network redefinition.

In some cases, the increasing and decreasing of the paths is accomplished at least via network access control reconfiguration.

In one or more embodiments (see, e.g., FIG. 4), each of the optical network terminals has a plurality of Ethernet ports connectable to a plurality of edge devices, and further steps include, for those of the areas determined in the monitoring step to have passive optical network port overutilization, activating additional corresponding ones of the Ethernet ports; and, for those of the areas determined in the monitoring step to have passive optical network port underutilization, reducing a number of active corresponding ones of the Ethernet ports. See, e.g., line 14 of FIG. 8.

In some such cases, in the activating of the additional corresponding ones of the Ethernet ports, the additional corresponding ones of the Ethernet ports are associated with an active one of the passive optical network ports.

Referring especially to FIGS. 8 and 18, in some instances, the software-defined passive optical network implements at least first and second classes of service; the monitoring further includes monitoring passive optical network port utilization for the at least first and second classes of service for each of the plurality of areas; and, in the increasing and reducing of the passive optical network ports, the first class of service is favored over the second class of service.

Monitoring the passive optical network port utilization for each of the plurality of areas can be carried out in a number of different ways. In one or more embodiments, monitoring occurs on the ONT ports themselves. Most network elements, including ONTs, implement the IEEE Standard Management Information Base (MIB), which records basic statistics. These statistics can be accessed via a "pull" process implemented with a standard Simple Network Management Protocol (SNMP) agent. In another aspect, PON equipment vendors typically implement data collection, and expose an API or command line interface that permits retrieving the information (e.g., via Secure Shell (SSH) or the like). Increasing or reducing the number of assigned PON ports can be implemented using logical (e.g., software) control of physical connections. The GPON standard allows for multiple paths between the OLT and the ONT under Type B and Type C protection schemes. The multiple paths can be implemented, for example, by utilizing two upstream ports on the ONT, so that it can accept two optical lines into it, or by using a 2:32 splitter instead of 1:32 splitter. A suitable agent (e.g., SDEN Agent 513) then configures the physical connections in an appropriate manner. The agent can, but need not, reside in the network, as long as it is provided with an interface to the network management subsystem (e.g. to a PON vendor provided management platform).

Increasing and decreasing the number of paths can be carried out with software control of the physical connections as described above with regard to increasing or reducing the number of assigned PON ports, as can activating additional Ethernet ports and reducing the number of active Ethernet ports.

Monitoring of different classes of service can be carried out with monitoring software such as NetFlow Traffic Analyzer available from SolarWinds Worldwide, LLC or similar management tools, which software monitors the quality of service (QoS) metrics related to the service, e.g., delay, jitter, and throughput. This software can also run on the management component.

In another aspect, a software-defined passive optical network includes a set of optical network terminals; a set of passive optical network ports; and a plurality of splitters. Each of the optical network terminals is connected to a single one of the passive optical network ports through a given one of the splitters, and the software-defined passive optical network is divided into a plurality of areas. Each of the areas is assigned a given fraction of the passive optical network ports. Also included is a control component coupled to the set of optical network terminals, the set of passive optical network ports, and the plurality of splitters. The control component in turn includes a memory; and at least one processor, coupled to the memory, and operative to carry out or otherwise facilitate any one, some, or all of the method steps disclosed herein.

Exemplary System and Article of Manufacture Details—Part 1

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 1, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

In some instances, unit 12 or the like implements techniques described herein and controls a PON via interface 20 or the like.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 1) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the elements depicted in the block diagrams or other figures and/or described herein; e.g., the aforementioned software service in Java that monitors the link utilization in the network and runs Algorithm 1 and Algorithm 2, optionally with sub-modules to implement the two algorithms. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules. In addition, pertinent databases typically include records in persistent storage accessed by database management system software. A portal or user interface may include hypertext markup language served out by a server to one or more client computers which, when executed on a browser of the client computer, creates a graphical user interface (GUI). Thus, one example of user interface can be implemented, for example, via hypertext markup language (HTML) code served out by a server or the like, to a browser of a computing device of a user. The HTML is parsed by the browser on the user's computing device to create a graphical user interface (GUI).

Exemplary System and Article of Manufacture Details—Part 2

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A non-transitory computer readable medium comprising computer executable instructions which when executed by a computer cause the computer to perform the method of:
   in a software-defined passive optical network comprising a set of optical network terminals, a set of passive optical network ports, and a plurality of splitters, each of said optical network terminals being connected to a single one of said passive optical network ports through a given one of said splitters, wherein said software-defined passive optical network is divided into a plurality of areas, each of said areas being assigned a given fraction of said passive optical network ports, monitoring passive optical network port utilization for each of said plurality of areas;
   for those of said areas determined in said monitoring step to have passive optical network port overutilization, increasing a number of said passive optical network ports assigned thereto; and
   for those of said areas determined in said monitoring step to have passive optical network port underutilization, reducing a number of said passive optical network ports assigned thereto;
   wherein said computer executable instructions, when executed by said computer, further cause the computer to perform the additional method steps of:
   for those of said areas determined in said monitoring step to have passive optical network port overutilization, increasing a number of paths thereto; and
   for those of said areas determined in said monitoring step to have passive optical network port underutilization, reducing a number of paths thereto;
   wherein each of said optical network terminals has a plurality of Ethernet ports connectable to a plurality of edge devices, and wherein said computer executable instructions, when executed by said computer, further cause the computer to perform the additional method steps of:

for those of said areas determined in said monitoring step to have passive optical network port overutilization, activating additional corresponding ones of said Ethernet ports; and for those of said areas determined in said monitoring step to have passive optical network port underutilization, reducing a number of active corresponding ones of said Ethernet ports.

2. The non-transitory computer readable medium of claim 1, wherein in said activating of said additional corresponding ones of said Ethernet ports, said additional corresponding ones of said Ethernet ports are associated with an active one of said passive optical network ports.

3. A non-transitory computer readable medium comprising computer executable instructions which when executed by a computer cause the computer to perform the method of:

in a software-defined passive optical network comprising a set of optical network terminals, a set of passive optical network ports, and a plurality of splitters, each of said optical network terminals being connected to a single one of said passive optical network ports through a given one of said splitters, wherein said software-defined passive optical network is divided into a plurality of areas, each of said areas being assigned a given fraction of said passive optical network ports, monitoring passive optical network port utilization for each of said plurality of areas;

for those of said areas determined in said monitoring step to have passive optical network port overutilization, increasing a number of said passive optical network ports assigned thereto; and for those of said areas determined in said monitoring step to have passive optical network port underutilization, reducing a number of said passive optical network ports assigned thereto;

wherein:

said software-defined passive optical network implements at least first and second classes of service;

said monitoring further comprises monitoring passive optical network port utilization for said at least first and second classes of service for each of said plurality of areas; and in said increasing and reducing of said passive optical network ports, said first class of service is favored over said second class of service.

4. A software-defined passive optical network comprising:
a set of optical network terminals;
a set of passive optical network ports;
a plurality of splitters, each of said optical network terminals being connected to a single one of said passive optical network ports through a given one of said splitters, said software-defined passive optical network being divided into a plurality of areas, each of said areas being assigned a given fraction of said passive optical network ports; and
a control component coupled to said set of optical network terminals, said set of passive optical network ports, and said plurality of splitters, said control component in turn comprising:
a memory; and
at least one processor, coupled to said memory, and operative to:
monitor passive optical network port utilization for each of said plurality of areas;

for those of said areas determined by said monitoring to have passive optical network port overutilization, increase a number of said passive optical network ports assigned thereto; and for those of said areas determined by said monitoring to have passive optical network port underutilization, reduce a number of said passive optical network ports assigned thereto;

wherein said at least one processor is further operative to:

for those of said areas determined by said monitoring to have passive optical network port overutilization, increase a number of paths thereto; and for those of said areas determined by said monitoring to have passive optical network port underutilization, reduce a number of paths thereto;

wherein each of said optical network terminals has a plurality of Ethernet ports connectable to a plurality of edge devices, and wherein said at least one processor is further operative to:

for those of said areas determined by said monitoring to have passive optical network port overutilization, activate additional corresponding ones of said Ethernet ports; and for those of said areas determined by said monitoring to have passive optical network port underutilization, reduce a number of active corresponding ones of said Ethernet ports.

5. The software-defined passive optical network of claim 4, wherein in said activating of said additional corresponding ones of said Ethernet ports, said additional corresponding ones of said Ethernet ports are associated with an active one of said passive optical network ports.

6. A software-defined passive optical network comprising:
a set of optical network terminals;
a set of passive optical network ports;
a plurality of splitters, each of said optical network terminals being connected to a single one of said passive optical network ports through a given one of said splitters, said software-defined passive optical network being divided into a plurality of areas, each of said areas being assigned a given fraction of said passive optical network ports; and
a control component coupled to said set of optical network terminals, said set of passive optical network ports, and said plurality of splitters, said control component in turn comprising:
a memory; and
at least one processor, coupled to said memory, and operative to:
monitor passive optical network port utilization for each of said plurality of areas;

for those of said areas determined by said monitoring to have passive optical network port overutilization, increase a number of said passive optical network ports assigned thereto; and for those of said areas determined by said monitoring to have passive optical network port underutilization, reduce a number of said passive optical network ports assigned thereto;

wherein:
said software-defined passive optical network implements at least first and second classes of service;
said at least one processor is further operative to monitor passive optical network port utilization for said at least first and second classes of service for each of said plurality of areas; and in said increasing and reducing of said passive optical network ports, said first class of service is favored over said second class of service.

\* \* \* \* \*